(12) United States Patent
Brukman et al.

(10) Patent No.: US 12,495,065 B2
(45) Date of Patent: Dec. 9, 2025

(54) PERFORMING A SECURITY ACTION REGARDING AN ACCESS REQUEST USING A CLUSTER-BASED DETERMINATION OF MALICIOUS INTENT

(71) Applicant: Microsoft Technology Licensing, LLC, Redmond, WA (US)

(72) Inventors: Ariel Brukman, Kiriat Ata (IL); Coral Cohen, Hadera (IL); Andrey Karpovsky, Kiryat Motzkin (IL); Ram Haim Pliskin, Rishon Lezion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 18/326,974

(22) Filed: May 31, 2023

(65) Prior Publication Data
US 2024/0406207 A1 Dec. 5, 2024

(51) Int. Cl.
*H04L 9/40* (2022.01)

(52) U.S. Cl.
CPC ...... *H04L 63/1441* (2013.01); *H04L 63/0807* (2013.01); *H04L 63/104* (2013.01); *H04L 63/1416* (2013.01); *H04L 63/1425* (2013.01)

(58) Field of Classification Search
CPC ............. H04L 63/1441; H04L 63/0807; H04L 63/104; H04L 63/1416; H04L 63/1425; H04L 63/101; G06F 21/552
See application file for complete search history.

(56) References Cited

U.S. PATENT DOCUMENTS

| | | | |
|---|---|---|---|
| 10,218,718 B2 * | 2/2019 | Kopp | H04L 63/1441 |
| 10,638,538 B2 | 4/2020 | Huang | |
| 10,860,720 B2 | 12/2020 | Hartnett et al. | |
| 11,290,483 B1 * | 3/2022 | Kannan | H04L 63/1433 |
| 2010/0218250 A1 * | 8/2010 | Mori | H04L 63/1441 |
| | | | 709/224 |

(Continued)

FOREIGN PATENT DOCUMENTS

| CN | 109194765 A | 1/2019 |
|---|---|---|
| CN | 114374531 A | 4/2022 |

OTHER PUBLICATIONS

International Search Report and Written Opinion received for PCT Application No. PCT/US2024/030290, Sep. 17, 2024, 12 pages.

*Primary Examiner* — Joe Chacko
(74) *Attorney, Agent, or Firm* — Wade IP Law PLLC

(57) ABSTRACT

Techniques are described herein that are capable of performing a security action regarding an access request using a cluster-based determination of malicious intent. Subsets of access requests are clustered into respective clusters, which correspond to respective requestor types, based at least on the access requests in the subsets having respective attributes that indicate the respective requestor types. A determination is made that a received access request, which is associated with a designated requestor type, is malicious based at least on a relationship between an access action, which is requested by the received access request using an access token, and an access behavior associated with a group of access requests in a designated cluster that use the access token. As a result of determining that the received access request is malicious, a security action is performed with regard to the received access request.

20 Claims, 8 Drawing Sheets

(56) References Cited

U.S. PATENT DOCUMENTS

| | | | |
|---|---|---|---|
| 2013/0298220 A1* | 11/2013 | Yoon | H04L 63/1416 726/11 |
| 2016/0028752 A1* | 1/2016 | Di Pietro | H04L 63/1416 726/23 |
| 2016/0028754 A1* | 1/2016 | Cruz Mota | H04L 63/1458 726/23 |
| 2016/0219067 A1* | 7/2016 | Han | H04L 63/1425 |
| 2018/0020014 A1* | 1/2018 | Kamiya | H04W 12/128 |
| 2020/0021609 A1* | 1/2020 | Kuppanna | H04L 63/20 |
| 2020/0213343 A1* | 7/2020 | Bharrat | G06N 3/045 |
| 2024/0291835 A1* | 8/2024 | Sethi | H04L 63/1425 |
| 2025/0007930 A1* | 1/2025 | Feng | H04L 63/1425 |

\* cited by examiner

PERFORMING A SECURITY ACTION REGARDING AN ACCESS REQUEST USING A CLUSTER-BASED DETERMINATION OF MALICIOUS INTENT

BACKGROUND

When a user requests access to a cloud resource, the user may provide an account key or an access token for the purpose of authentication. The user may be authenticated by using the account token or the access token to verify the identity of the user. Authentication of the user enables the user to utilize permissions defined by the account key or the access token. The permissions defined by an account key provide "root" access to an account with which the account key is associated. Accordingly, the account key typically does not allow control usage, which may lead to substantial harm if the account key is compromised. Accordingly, it may not be desirable to use an account key for many business applications.

An access token often provides more flexibility and security than an account key. For instance, an access token can be created on-demand, can provide substantial control to the account owner, can be canceled by revoking a signing key that is used to sign the account token, and can be configured to automatically expire after a specified time.

Nevertheless, a malicious entity still may be capable of using an access token to perform malicious operations with regard to cloud resources. An account owner may discover such malicious operations only after consuming substantial time and resources or after substantial harm occurs, or the account owner may not detect the malicious operations at all. Even if the account owner is warned of potential security vulnerabilities with regard to the access token before such malicious operations are performed, the account owner may not perform a remedial action to address the vulnerabilities.

SUMMARY

It may be desirable to cluster access requests into clusters based on (e.g., based at least on) respective requestor types and to perform a security action with regard to a received access request as a result of using the clustering to identify the received access request as a malicious access request. An access request is a request to access a cloud resource. A cloud resource is a resource that is hosted in the cloud. Examples of a resource include but are not limited to a physical device, a file, a folder, and a volume. A requestor type is a type of entity from which an access request is received. Examples of a requestor type include but are not limited to a developer, an end user, a system administrator, and a machine service (e.g., a backend service). Each requestor type may include multiple other requestor types. For instance, an "end user" requestor type may include an "end user providing an access request through a website" requestor type and "an end user providing an access request through an application" requestor type. An access token is a string that includes a credential, which identifies a cloud resource, and that defines permissions associated with the cloud resource. A string is a sequence (e.g., a variable length sequence) of arbitrary bytes, which may include bytes with value zero (a.k.a. nulls). The string may have a proprietary format. The access token may enable an application to securely call protected web application programming interfaces (APIs) on behalf of a user. For instance, the access request may include (e.g., may be) an API request. The access token may represent authorization of the application to access specific portions of the user's data. The access token may be issued by an authorization server as part of an OAuth 2.0 flow. The access token may attach to an initial process that is created in a user session. The access token may be inherited by a (descendant) process from an ancestor process, such as a child process inheriting the access token from a parent process that creates it.

An access token may be tailored to one or more requestor types. For example, a first access token may have first permissions that are tailored to a first requestor type; a second access token may have second permissions that are tailored to a second requestor type, and so on. In accordance with this example, it may be desirable for developers to have read, write, and delete permissions to containers on which the developers are working; end users to have read access to particular blobs with a relatively short expiration period; system administrators to have read, write, and delete permissions to an entire user account; and backend services to have read and write permissions to internet protocol (IP) addresses of virtual machines that are used (e.g., created) by the backend services. The permissions described with regard to the example requestor types mentioned above are provided for non-limiting, illustrative purposes. It will be recognized that any suitable permissions may be assigned to each requestor type.

Various approaches are described herein for, among other things, performing a security action regarding an access request using a cluster-based determination of malicious intent. In an example approach, subsets of access requests are clustered into respective clusters, which correspond to respective requestor types, based at least on the access requests in the subsets having respective attributes that indicate the respective requestor types. The access requests request access to cloud resources.

In a first aspect of this approach, an identified group of the access requests is distinguished from the other access requests based at least on the identified group being included in a designated cluster, which corresponds to a designated requestor type, and further based at least on the access requests that are included in the identified group utilizing a designated access token. In accordance with the first aspect, a determination is made that a received access request is a malicious access request based at least on the received access request being received from an access requestor of the designated requestor type and further based at least on the received access request using the designated access token to request performance of an access action that is not included in a scope of access behavior that is associated with the identified group of the access requests. In further accordance with the first aspect, as a result of determining that the received access request is the malicious access request, a security action is performed with regard to the received access request.

In a second aspect of this approach, an identified access request is received from an access requestor of a first requestor type. The identified access request uses an identified access token to request performance of a designated access action. In accordance with the second aspect, access behaviors that are associated with the access requests in the respective clusters and that correspond to the identified access token are identified. The access behaviors include a first access behavior indicating first predicted likelihoods of respective actions to be performed with regard to a first arbitrary access request that corresponds to the first requestor type and that uses the identified access token. The access behaviors further include a second access behavior indicating second predicted likelihoods of the respective actions to be performed with regard to a second arbitrary access request that corresponds to the second requestor type and that uses the identified access token. In further accordance with the second aspect, a determination is made that the identified access request is a malicious access request based at least on the first access behavior indicating a relatively low predicted likelihood of the designated access action to be performed with regard to the first arbitrary access request that corresponds to the first requestor type and further based at least on the second access behavior indicating a relatively high predicted likelihood of the designated access action to be performed with regard to the second arbitrary access request that corresponds to the second requestor type. In further accordance with the second aspect, as a result of determining that the identified access request is the malicious access request, a security action is performed with regard to the identified access request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
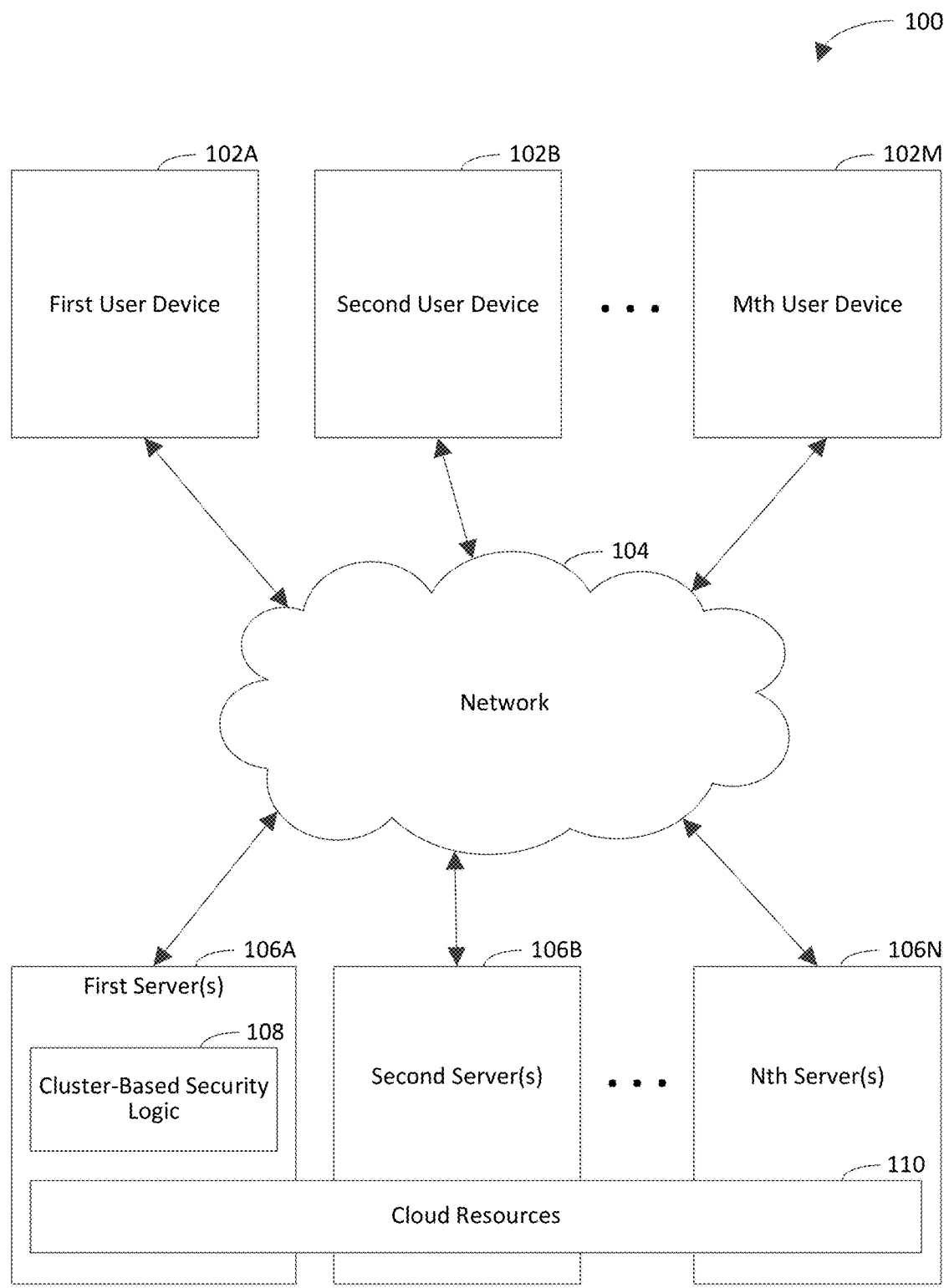
FIG. 1 is a block diagram of an example cluster-based security system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to cluster access requests into clusters based on (e.g., based at least on) respective requestor types and to perform a security action with regard to a received access request as a result of using the clustering to identify the received access request as a malicious access request. An access request is a request to access a cloud resource. A cloud resource is a resource that is hosted in the cloud. Examples of a resource include but are not limited to a physical device, a file, a folder, and a volume. A requestor type is a type of entity from which an access request is received. Examples of a requestor type include but are not limited to a developer, an end user, a system administrator, and a machine service (e.g., a backend service). Each requestor type may include multiple other requestor types. For instance, an "end user" requestor type may include an "end user providing an access request through a website" requestor type and "an end user providing an access request through an application" requestor type. An access token is a string that includes a credential, which identifies a cloud resource, and that defines permissions associated with the cloud resource. A string is a sequence (e.g., a variable length sequence) of arbitrary bytes, which may include bytes with value zero (a.k.a. nulls). The string may have a proprietary format. The access token may enable an application to securely call protected web application programming interfaces (APIs) on behalf of a user. For instance, the access request may include (e.g., may be) an API request. The access token may represent authorization of the application to access specific portions of the user's data. The access token may be issued by an authorization server as part of an OAuth 2.0 flow. The access token may attach to an initial process that is created in a user session. The access token may be inherited by a (descendant) process from an ancestor process, such as a child process inheriting the access token from a parent process that creates it.

An access token may be tailored to one or more requestor types. For example, a first access token may have first permissions that are tailored to a first requestor type; a second access token may have second permissions that are tailored to a second requestor type, and so on. In accordance with this example, it may be desirable for developers to have read, write, and delete permissions to containers on which the developers are working; end users to have read access to particular blobs with a relatively short expiration period; system administrators to have read, write, and delete permissions to an entire user account; and backend services to have read and write permissions to internet protocol (IP) addresses of virtual machines that are used (e.g., created) by the backend services. The permissions described with regard to the example requestor types mentioned above are provided for non-limiting, illustrative purposes. It will be recognized that any suitable permissions may be assigned to each requestor type.

Example embodiments described herein are capable of performing a security action regarding an access request using a cluster-based determination of malicious intent. Example techniques described herein have a variety of benefits as compared to conventional techniques for determining whether an access request is malicious. For instance, the example techniques are capable of determining whether an access action that is requested by a received access request is beyond a scope of access behavior associated with a group of access requests or has a relatively low likelihood of being requested by an access request in the group. For instance, the access requests in the group may be characterized by corresponding to the same requestor type as the received access request. In some instances, the access requests in the group may be further characterized by utilizing the same access token as the received access request. A determination that the access action that is requested by the received access request is beyond the scope of the access behavior associated with the group of access requests or has a relatively low likelihood of being requested by an access request in the group may indicate that the access action is not a normal access action with regard to the access requests in the group. A normal access action with regard to access requests in a group is an access action having a likelihood of being requested by an access request in the group that is that is greater than or equal to a threshold likelihood (e.g., 30%, 40%, 50%, or 80%). Examples of an access action include but are not limited to reading a blob by an entity having an IP address that is internal to an organization, writing to a container by an entity having an IP address that is external to the organization, deleting information from a user account by an entity that is not the owner of the user account, and writing information to a virtual machine that is associated with a backend service of an application. The example techniques are capable of performing a security action (e.g., preventing the requested access action from being performed and/or providing a security alert) as a result of determining that the access action requested by the received access request is beyond the scope of the access behavior associated with the group of access requests or has a relatively low likelihood of being requested by an access request in the group.

The example techniques may increase security of a cloud resource or a computing system that hosts the cloud resource. For instance, by performing a security action (e.g., preventing a requested access action from being performed and/or providing a security alert) with regard to a received access request that requests access to the cloud resource, the example techniques may reduce a likelihood of a malicious entity being able to perform a malicious operation with regard to the cloud resource. For instance, performing the security action may prevent the malicious entity from performing an operation that is outside the scope of the access behavior associated with the one or more requestor types and/or an access token that is used by the received access request. The example techniques may reduce the likelihood of a malicious entity being able to perform a malicious operation with regard to a cloud resource without requiring manual effort and domain expertise by a developer or administrator. The example techniques may be dynamic such that the example techniques are capable of responding to changes in usage and/or configuration of access token(s).

The example techniques may reduce an amount of time and/or resources (e.g., processor cycles, memory, network bandwidth) that is consumed by a computing system to determine whether a received access request is malicious. For instance, by determining that an access action requested by the received access request is beyond a scope of access behavior associated with a group of access requests or has a relatively low likelihood of being requested by an access request in the group, the example techniques may avoid consumption of time and/or resources that otherwise would have been consumed to analyze access behavior of access requests that are outside the group. By preventing an access action that is requested by a received access request from being performed as a result of the received access request being identified as malicious, the example techniques may avoid consumption of time and/or resources that otherwise would have been consumed to address harm resulting from performance of the access action. By providing a security alert that indicates that an access action requested by a received access request is not included in a scope of access behavior associated with a particular group of access requests, the example techniques may avoid consumption of time and/or resources that otherwise would have been consumed to determine whether the access behavior is likely to be requested by an access request having attribute(s) associated with the group (e.g., particular requestor type(s) and/or a particular access token).

By reducing the amount of time and/or resources that is consumed by the computing system, the efficiency of the computing system may be increased and/or a cost associated with executing the computer program may be reduced.

A user experience of a developer or information technology (IT) administrator who is tasked with managing security of cloud resources may be increased, for example, by preventing an access action requested by a malicious access request from being performed and/or by providing a security alert regarding the malicious access request to the developer or IT administrator.

A user experience of an end user who requests access to a cloud resource may be increased, for example, by reducing a likelihood that the cloud resource or a computing system that hosts the cloud resource is compromised by a malicious entity.

FIG. 1 is a block diagram of an example cluster-based security system 100 in accordance with an embodiment. Generally speaking, the cluster-based security system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the cluster-based security system 100 performs a security action regarding an access request using a cluster-based determination of malicious intent. Detail regarding techniques for performing a security action regarding an access request using a cluster-based determination of malicious intent is provided in the following discussion.

As shown in FIG. 1, the cluster-based security system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the cluster-based security system 100.

One example type of computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network. The cloud computing program executes at least in part in the cloud. The cloud may be a remote cloud, an on-premises cloud, or a hybrid cloud. It will be recognized that an on-premises cloud may use remote cloud services.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include cluster-based security logic 108 for illustrative purposes. The cluster-based security logic 108 is configured to perform a security action regarding an access request using a cluster-based determination of malicious intent. The cluster-based security logic 108 clusters subsets of access requests into respective clusters, which correspond to respective requestor types, based at least on the access requests in the subsets having respective attributes that indicate the respective requestor types. The access requests request access to cloud resources 110.

In a first example implementation, the cluster-based security logic 108 distinguishes an identified group of the access requests from the other access requests based at least on the identified group being included in a designated cluster, which corresponds to a designated requestor type, and further based at least on the access requests that are included in the identified group utilizing a designated access token. In accordance with the first example implementation, the cluster-based security logic 108 determines that a received access request is a malicious access request based at least on the received access request being received from an access requestor of the designated requestor type and further based at least on the received access request using the designated access token to request performance of an access action that is not included in a scope of access behavior that is associated with the identified group of the access requests. In further accordance with the first example implementation, as a result of determining that the received access request is the malicious access request, the cluster-based security logic 108 performs (e.g., automatically performs) a security action with regard to the received access request.

In a second example implementation, the cluster-based security logic 108 receives an identified access request from an access requestor of a first requestor type. The identified access request uses an identified access token to request performance of a designated access action. In accordance with the second example implementation, the cluster-based security logic 108 identifies access behaviors that are associated with the access requests in the respective clusters and that correspond to the identified access token. The access behaviors include a first access behavior indicating first predicted likelihoods of respective actions to be performed with regard to a first arbitrary access request that corresponds to the first requestor type and that uses the identified access token. The access behaviors further include a second access behavior indicating second predicted likelihoods of the respective actions to be performed with regard to a second arbitrary access request that corresponds to the second requestor type and that uses the identified access token. In further accordance with the second example implementation, the cluster-based security logic 108 determines that the identified access request is a malicious access request based at least on the first access behavior indicating a relatively low predicted likelihood of the designated access action to be performed with regard to the first arbitrary access request that corresponds to the first requestor type and further based at least on the second access behavior indicating a relatively high predicted likelihood of the designated access action to be performed with regard to the second arbitrary access request that corresponds to the second requestor type. In further accordance with the second example implementation, as a result of determining that the identified access request is the malicious access request, the cluster-based security logic 108 performs (e.g., automatically performs) a security action with regard to the identified access request.

The cloud resources 110 are shown in FIG. 1 to be distributed across the servers 106A-106N for non-limiting, illustrative purposes. It will be recognized that the cloud resources 110 may be hosted by any one or more of the servers 106A-106N.

Security of the cloud resources 110 and computing systems (e.g., any one or more of the servers 106A-106N) on which the cloud resources 110 are hosted may be increased by ensuring that a requested access action that exceeds the business needs of each user, groups of users, application, and/or group of applications that may seek to legitimately access the cloud resources 110 is not performed and/or is reported to a developer or information technology (IT) administrator who is tasked with managing security of the cloud resources 110. By performing a security action (e.g., preventing performance of the requested access action and/or providing a security alert) based on (e.g., based at least on) a relationship between the requested access action and a scope of access behavior associated with access requests that are included in particular cluster(s) and/or that utilize a particular access token, a likelihood of malicious actions being performed with regard to the cloud resources 110 may be reduced.

The cluster-based security logic 108 may use machine learning to perform at least some of its operations. For instance, the cluster-based security logic 108 may use the machine learning to analyze (e.g., develop and/or refine an understanding of) access requests (e.g., attributes thereof, resources identified therein, and types of access requested), clusters of the access requests, access behaviors associated with the clusters, requestor types, access tokens (e.g., permissions defined therein and resources identified therein), relationships between any of the foregoing elements, and confidences in those relationships. For example, the cluster-based security logic 108 may use the machine learning to identify access behaviors associated with one or more requestor types and/or a designated access token and to determine whether a received access request is a malicious access request.

The cluster-based security logic 108 may use classifiers to perform at least some of its operations. For instance, the cluster-based security logic 108 may label access requests with labels and use the labels cluster subsets of the access requests into respective clusters and to determine access behaviors associated with the clusters (or groups therein). For example, each label of an access request may include information indicating an attribute of the access request, a cluster (or group therein) into which the access request is clustered, an access behavior associated with the access request, a requestor type associated with the access request, and/or an access token that is used by the access request. The cluster-based security logic 108 may use the labels to classify (e.g., cluster) the access requests for purposes of identifying access behaviors associated with the clusters (or groups therein) and for purposes of determining whether a received access request is a malicious access request.

The cluster-based security logic 108 may be implemented in various ways to perform a security action regarding an access request using a cluster-based determination of malicious intent, including being implemented in hardware, software, firmware, or any combination thereof. For example, the cluster-based security logic 108 may be implemented as computer program code configured to be executed in one or more processors. In another example, at least a portion of the cluster-based security logic 108 may be implemented as hardware logic/electrical circuitry. For instance, at least a portion of the cluster-based security logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the cluster-based security logic 108 may be (or may be included in) a cloud computing program, though the scope of the example embodiments is not limited in this respect.

The cluster-based security logic 108 is shown to be incorporated in the first server(s) 106A for illustrative purposes and is not intended to be limiting. It will be recognized that the cluster-based security logic 108 (or any portion(s) thereof) may be incorporated in any one or more of the servers 106A-106N, any one or more of the user devices 102A-102M, or any combination thereof. For example, client-side aspects of the cluster-based security logic 108 may be incorporated in one or more of the user devices 102A-102M, and server-side aspects of cluster-based security logic 108 may be incorporated in one or more of the servers 106A-106N.

Figure 2:
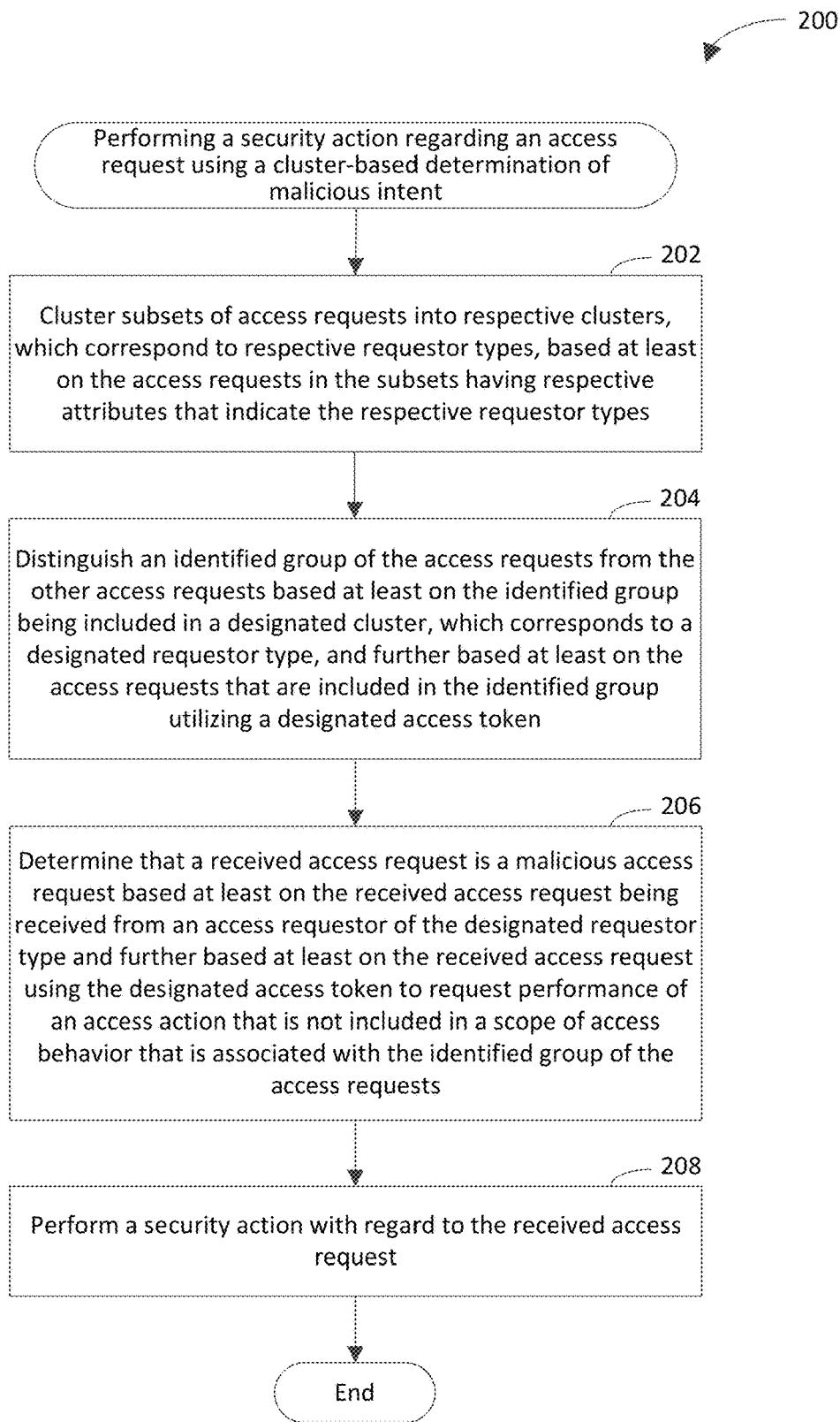
FIGS. 2-3 and 5-6 depict flowcharts of example methods for performing a security action regarding an access request using a cluster-based determination of malicious intent in accordance with embodiments.
Figure 3:
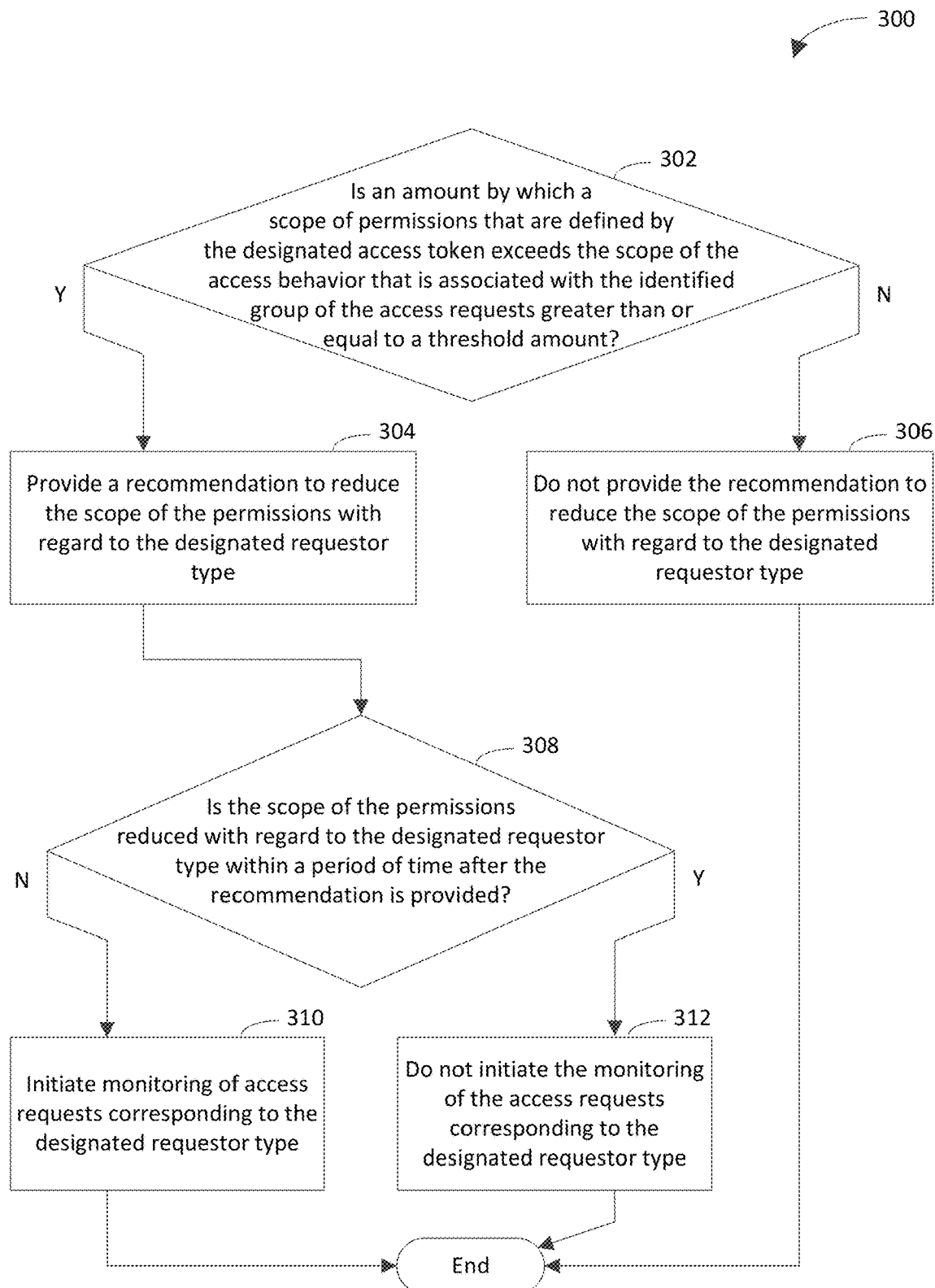
Figure 4:
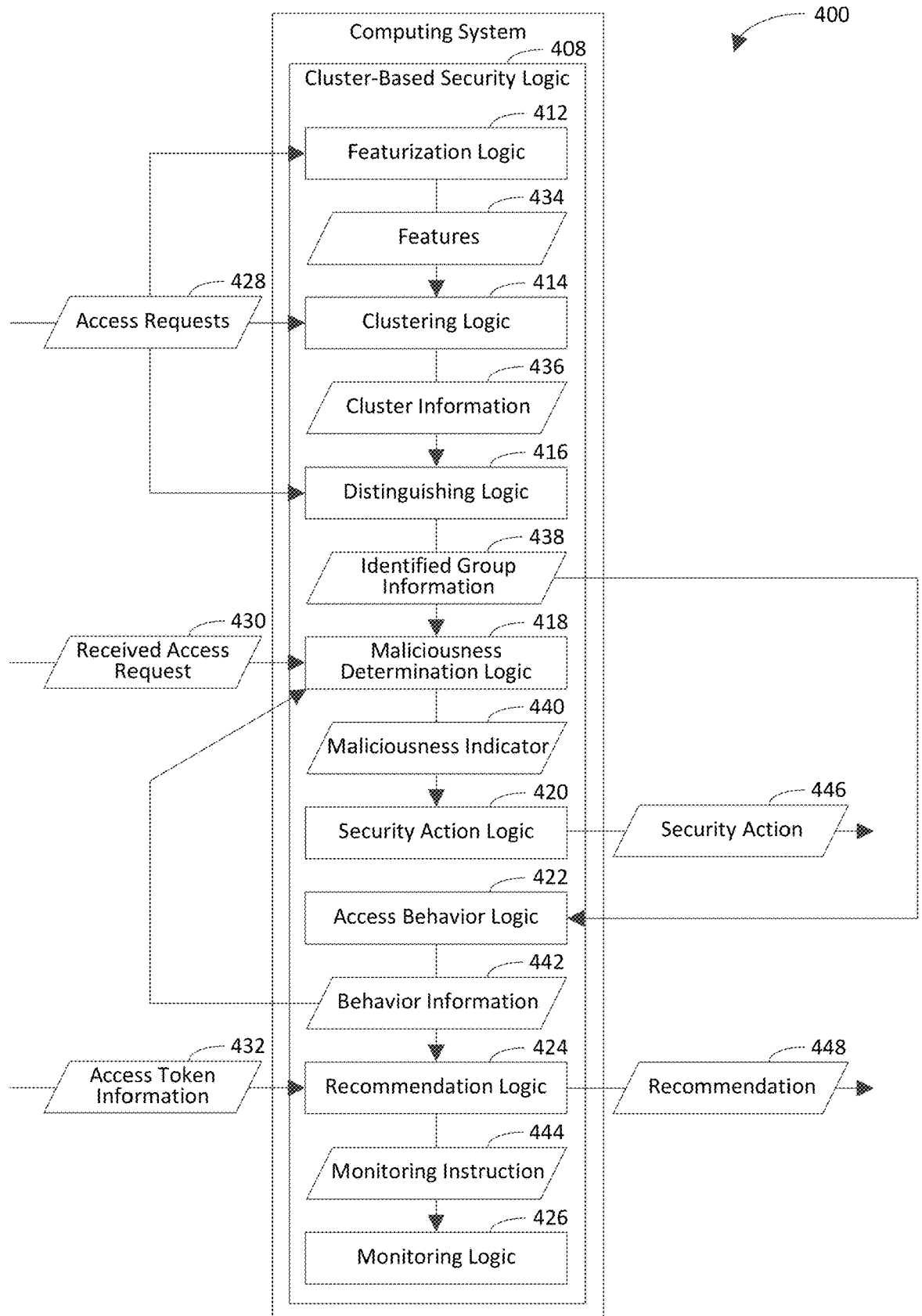
FIGS. 4 and 7 are block diagrams of example computing systems in accordance with embodiments.

FIGS. 2-3 depict flowcharts 200 and 300 of example methods for performing a security action regarding an access request using a cluster-based determination of malicious intent in accordance with embodiments. Flowcharts 200 and 300 may be performed by the first server(s) 106A shown in FIG. 1, for example. For illustrative purposes, flowcharts 200 and 300 are described with respect to computing system 400 shown in FIG. 4, which is an example implementation of the first server(s) 106A. As shown in FIG. 4, the computing system 400 includes cluster-based security logic 408. The cluster-based security logic 408 includes featurization logic 412, clustering logic 414, distinguishing logic 416, maliciousness determination logic 418, security action logic 420, access behavior logic 422, recommendation logic 424, and monitoring logic 426. Further structural and operational embodiments will be apparent to persons skilled in the relevant art(s) based on the discussion regarding flowcharts 200 and 300.

As shown in FIG. 2, the method of flowchart 200 begins at step 202. In step 202, subsets of access requests are clustered into respective clusters, which correspond to respective requestor types, based at least on the access requests in the subsets having respective attributes that indicate the respective requestor types. The access requests request access to cloud resources. Examples of an attribute include but are not limited to an internet protocol (IP) address of a requestor (e.g., a source) from which an access request is received, a referrer that refers the access request, a user-agent that provides the access request on behalf of the requestor, a type of authentication used by the access request, an authentication key that is used by the access request, a target (e.g., storage account, container, or bucket) of the access request, a timestamp indicating a time instance at which the access request is generated, and a success status of the access request. The success status indicates whether receipt of the access request, which requests access to a cloud resource, resulted in access to the cloud resource being granted. For instance, the success status may indicate a successful access or a failed attempt to access. The success status may indicate whether a further authentication was required (e.g., a redirect to authentication service). For example, an attempt to access a cloud resource that does not exist (e.g., has been deleted or never existed) will result in a failed attempt to access the cloud resource. The success status may include (e.g., be) a hypertext transfer protocol (HTTP) status, though the scope of the example embodiments is not limited in this respect.

In an aspect, clustering the subsets of the access requests at step 202 includes balancing multiple criteria, such as cluster size, cluster content, and a number of required attributes. For example, a relatively larger cluster size may be preferable. In another example, homogeneity of inliers may be preferable. In yet another example, a relatively lower number of required attributes may be preferable. For some example clustering techniques (e.g., hierarchical clustering), a number of clusters that are utilized to cluster the subsets of the access requests at step 202 may be selected (e.g., optimized) based on the multiple criteria. In another aspect, a predefined number of clusters may be utilized to cluster the subsets of the access requests at step 202.

In an example implementation, the clustering logic 414 clusters subsets of access requests 428 into the respective clusters based at least on the access requests 428 in the subsets having respective attributes that indicate the respective requestor types. For example, the clustering logic 414 may cluster a first subset of the access requests 428 into a first cluster based on the access requests 428 that are included in the first subset having a first attribute that indicates a first requestor type; the clustering logic 414 may cluster a second subset of the access requests 428 into a second cluster based on the access requests 428 that are included in the second subset having a second attribute that indicates a second requestor type, and so on. Each of the access requests 428 requests access to a cloud resource. The clustering logic 414 generates cluster information 436 to identify each of the clusters and to indicate (e.g., specify) which of the access requests 428 are clustered into each cluster. The cluster information 436 may indicate other attributes of the access requests 428, as well. For instance, the cluster information 436 may indicate which access tokens are used by the respective access requests 428, the requestor type associated with each of the access tokens 428, access actions that are requested by the respective access requests 428, and so on.

In an example embodiment, the subsets of the access requests are clustered into the respective clusters at step 202 using sampling. Sampling is a technique of selecting individual members or a subset of a population to make statistical inferences from them and estimate the characteristics of an entirety of the population. Examples of sampling include but are not limited to probability sampling and non-probability sampling.

Probability sampling is a sampling technique in which one or more criteria are selected, and members of a population are randomly selected using the one or more criteria to create a sample. All members of the population that satisfy the one or more criteria have an equal opportunity to be included in the sample. Examples of probability sampling include but are not limited to simple random sampling, stratified sampling, cluster sampling, and systematic clustering.

In simple random sampling, every element has an equal chance of being selected for inclusion in the sample. Simple random sampling may be used when no prior information about the population is available.

In stratified sampling, the elements of the population are divided into subgroups (a.k.a. strata) based on similarity such that the elements are heterogeneous within the group and are homogeneous within each subgroup. After the elements are divided in this manner, elements are randomly selected from each of the strata. Prior information about the population is used to create the subgroups.

In cluster sampling, the population (e.g., an entirety of the population) is divided into clusters (a.k.a. sections), and clusters are randomly selected. All the elements of a cluster are used for sampling. The clusters may be identified using attributes such as age, sex, and location.

In systematic clustering, the selection of elements is systematic and not random, except for the first element. Elements of a sample are chosen at regular intervals of population. The elements are combined in a sequence in which each element has an equal chance of being selected.

Non-probability sampling is a sampling technique in which members are chosen at random. Non-probability sampling is not a fixed or predefined selection technique, which may cause difficulty for all elements of a population to have equal opportunities to be included in a sample.

When using K-means clustering, elbow plots may be used to select the number of clusters. To produce an elbow plot, a K-means algorithm may be run iteratively, first with K=1, then K=2, and so on, and the variation within clusters at each value of K may be computed. Variation may be calculated by summing squared distances from each point to the center of the cluster. Using K-means with only one cluster results in a relatively high variance within the cluster, whereas using K-means with multiple clusters that each include a single point results in a variance of zero. Increasing K and increasing cluster numbers leads to a decrease in the total variation within clusters. The elbow method aims to identify the point of inflection (i.e., the "elbow") on the curve. After the point of inflection, adding additional clusters does not minimize the variance within a cluster sufficiently to justify the additional clusters.

In an example embodiment, the subsets of the access requests are clustered into the respective clusters at step 202 based at least on the access requests in the subsets being initiated by sources having IP addresses in respective ranges of IP addresses that indicate the respective requestor types. For instance, a first subset of the access requests may be clustered into a first cluster based at least on the access requests in the first subset being initiated by sources having IP addresses in a first IP address range associated with a first requestor type; a second subset of the access requests may be clustered into a second cluster based at least on the access requests in the second subset being initiated by sources having IP addresses in a second IP address range associated with a second requestor type, and so on.

In another example embodiment, the subsets of the access requests are clustered into the respective clusters at step 202 based at least on the subsets of the access requests having respective referrer attributes that indicate respective intermediate entities that correspond to the respective requestor types. For instance, a first subset of the access requests may be clustered into a first cluster based at least on the access requests in the first subset having a first referrer attribute that indicates a first intermediate entity that corresponds to a first requestor type; a second subset of the access requests may be clustered into a second cluster based at least on the access requests in the second subset having a second referrer attribute that indicates a second intermediate entity that corresponds to a second requestor type, and so on. An intermediate entity is an entity that is between a source that initiates an access request and a target to which the access request is directed.

In yet another example embodiment, the subsets of the access requests are clustered into the respective clusters at step 202 based at least on the access requests in the subsets being received from user-agents that indicate the respective requestor types. For instance, a first subset of the access requests may be clustered into a first cluster based at least on the access requests in the first subset being received from user-agents corresponding to a first requestor type; a second subset of the access requests may be clustered into a second cluster based at least on the access requests in the second subset being received from user-agents corresponding to a second requestor type, and so on. A user-agent from which an access request is received is an entity that provides the access request on behalf of a user (i.e., human). Examples of a user-agent include but are not limited to a web browser, a specific version of a web browser, and web crawler. A web crawler is an Internet bot that systematically browses the Word Wide Web (WWW).

At step 204, an identified group of the access requests is distinguished from the other access requests based at least on the identified group being included in a designated cluster, which corresponds to a designated requestor type, and further based at least on the access requests that are included in the identified group utilizing a designated access token. In an aspect, the designated access token is not user specific, meaning that the designated access token is not specific to a particular user. For example, the designated access token may be a private access token (PAT). A PAT is a token that includes a credential that proves that an access request that uses the PAT is received from a legitimate device without disclosing an identity of a user (e.g., the user who initiated the access request). In another example, the designated access token may be a shared access signature (SAS). A SAS is a signed URI that points to one or more cloud resources. The URI includes a token that includes query parameters. The query parameters include a signature with which the URI is signed. In an aspect, the SAS is created using an account or user key. In accordance with this example, the account or user key may be used to sign the URI. For instance, using the account or user key to sign the URI enables a user to share the SAS with other users and applications, which may enable the other users and applications to access an account (e.g., storage account) of the user without providing an account key associated with the account.

An example SAS may be defined as follows: "sv=22015-06-07@sr=b@sig=39Up9JxHkxUhFEjEH9594DJxe7w6c IRCgOV6ICGSo%3D&se=2016-09-17T21%3A51%3A 37Z&sp=rcw". This SAS may include all the information needed for a storage account to grant access to a specific resource. For instance, the SAS may be parsed to identify the following fields: signature (labeled as "sig"), signed expiry (labeled as "se"), signed resources (labeled as "sr"), and signed permissions (labeled as "sp"). The signature in this example is a hash of an individual unique key signature, which can be used as a key identifier (ID). The signature field is represented as "sig=39Up9JxHkxUhFEjEH9594DJxe7w6cIRCgOV6ICG So%3D&". The signed expiry has a value that defines a time at which the SAS becomes invalid (e.g., non-functional). The signed expiry field is represented as "se=2016-09-17T21", meaning that the SAS becomes invalid at 21:00 (i.e., 9:00 pm) on Sep. 17, 2016. The signed resources are the resources to which the SAS grants access. The signed resources field is represented as "sr=b", indicating that the SAS grants access to content and metadata of the blob, which is represented as "b" in the signed resources field. The signed permissions are the permissions that are granted by the SAS. The signed permissions field is represented as "sp=rcw", indicating that the SAS grants read (labeled as "r"), create (labeled as "c"), and write (labeled as "w") permissions. The read ("r") permission enables the resource to be read. The create ("c") permission enables creation of the resource. The write ("w") permission enables content and metadata of the resource to be written. Some other examples of a permission that may be granted by the SAS include but are not limited to a delete ("d") permission and a list ("l") permission. The delete ("d") permission enables deletion of the resource. The list ("l") permission enables objects to be listed within the resource.

In an example implementation, the distinguishing logic 416 distinguishes an identified group of the access requests 428 from the other access requests based at least on the identified group being included in a designated cluster, which corresponds to a designated requestor type, and further based at least on the access requests that are included in the identified group utilizing a designated access token. In an aspect, the distinguishing logic 416 distinguishes the identified group by analyzing the cluster information 436 to determine which of the clusters includes each of the access requests 428 and to determine which of the access requests 428 that are included in the designated cluster use the designated access token. In another aspect, the distinguishing logic 416 distinguishes the identified group by analyzing the cluster information 436 to determine which access token is used by each of the access requests 428 and to determine which of the access requests 428 that use the designated access token are included in the designated cluster. The distinguishing logic 416 generates identified group information 438 to indicate which of the access requests 428 are included in the identified group. The identified group information 438 may indicate other attributes of the access requests 428 that are included in the identified group, as well. For example, the identified group information 438 may indicate that the access requests 428 that are included in the identified group utilize the designated access token, are included in the designated cluster, and/or correspond to the designated requestor type. In another example, the identified group information 438 may indicate the access actions that are requested by the respective access requests 428 that are included in the identified group.

At step 206, a determination is made that a received access request is a malicious access request based at least on the received access request being received from an access requestor of the designated requestor type and further based at least on the received access request using the designated access token to request performance of an access action that is not included in a scope of access behavior that is associated with the identified group of the access requests. In an example implementation, the maliciousness determination logic 418 determines that a received access request 430 is a malicious access request based at least on the received access request 430 being received from an access requestor of the designated requestor type and further based at least on the received access request 430 using the designated access token to request performance of an access action that is not included in a scope of access behavior that is associated with the identified group of the access requests. For example, the maliciousness determination logic 418 may analyze the received access request 430 to determine that the received access request 430 is received from the access requestor of the designated requestor type, uses the designated access token, and requests performance of a specified access action. In an aspect, the access behavior logic 422 analyzes the identified group information 438 to determine the access actions that are requested by the access requests 428 that are included in the identified group. In accordance with this aspect, the access behavior logic 422 determines the scope of the access behavior associated with the identified group based on the access actions that are requested by the access requests 428 that are included in the identified group. The access behavior logic 422 generates behavior information 442 to indicate the scope of the access behavior associated with the identified group. The maliciousness determination logic 418 compares the specified access action requested by the received access request 430 and the scope of the access behavior associated with the identified group, as indicated by the behavior information 442, to determine that the specified access action requested by the received access request 430 is not included in the scope of the access behavior associated with the identified group. The maliciousness determination logic 418 generates a maliciousness indicator 440 to indicate that the received access request 430 is malicious.

In an example embodiment, the received access request is determined to be the malicious access request at step 206 even though the access action is within a scope of permissions that are defined by the designated access token. In an aspect, the permissions are indicated by an identifier associated with the designated access token. For example, the permissions may be specified in a hash that identifies the designated access token. In another example, the identifier may be a uniform resource identifier (URI), such as a uniform resource name (URN) or a uniform resource locator (URL).

At step 208, as a result of determining that the received access request is the malicious access request, a security action is performed with regard to the received access request. In an example implementation, the security action logic 420 performs a security action 446 with regard to the received access request 430 based on receipt of the maliciousness indicator 440 (e.g., based on the maliciousness indicator 440 indicating that the received access request 430 is malicious).

In an example embodiment, performing the security action at step 208 includes preventing the access action from being performed.

In another example embodiment, performing the security action at step 208 includes providing a security alert that indicates that the access action is not included in the scope of the access behavior that is associated with the identified group of the access requests. For instance, the security alert may indicate an extent of a disparity between the access action and the scope of the access behavior. In an aspect, the security alert is provided in real-time (e.g., on-the-fly). In accordance with this aspect, providing the security alert may be triggered by a determination that the access action that is requested to be performed is not included in the scope of the access behavior that is associated with the identified group of the access requests. In another aspect, providing the security alert includes opening a support ticket that indicates that the access action that is requested to be performed is not included in the scope of the access behavior that is associated with the identified group of the access requests.

In some example embodiments, one or more steps 202, 204, 206, and/or 208 of flowchart 200 may not be performed. Moreover, steps in addition to or in lieu of steps 202, 204, 206, and/or 208 may be performed. For instance, in an example embodiment, the method of flowchart 200 further includes identifying the access behavior that is associated with the identified group of the access requests by analyzing a data plane log that describes accesses of end users to a cloud resource using the designated access token. In an aspect, a data plane log includes information about packets that are processed by a data plane. A data plane is a component of a router that examines an incoming packet and forwards the incoming packet to a target destination in a network. Examples of a data plane include but are not limited to an Ethernet network, a Wi-Fi network, a cellular network, and a satellite network. In an example, the data plane log may include names of files that are uploaded to a server, sizes of the files, IP addresses from which the files are uploaded, and so on. In an example implementation, the access behavior logic 422 identifies the access behavior that is associated with the identified group of the access requests by analyzing the data plane log.

In another example embodiment, the method of flowchart 200 further includes identifying the access behavior that is associated with the identified group of the access requests by analyzing a token management service log that describes administrative operations that are performed using the designated access token. An administrative operation is an operation that defines how information is to be managed, routed, and/or processed. For instance, the administrative operation may be performed by a service or an administrator. An example of an administrative operation is the creation of an access token (e.g., to be used by access requests). The token management service log includes information generated and/or stored by a token management service. A token management service is a service that manages tokens (e.g., access tokens). In an example implementation, the access behavior logic 422 identifies the access behavior that is associated with the identified group of the access requests by analyzing the token management service log.

In yet another example embodiment, the method of flowchart 200 further includes featurizing the attributes of the access requests in the subsets to provide features, which are numerical representations of the attributes. For example, featurizing the attributes may include converting data (e.g., text data, graph data, or time-series data) associated with the attributes into a numerical vector (e.g., a compressed spatial index). Featurizing the attributes may utilize K-means featurization to create a compressed spatial index of the data, which can be fed into a model. Featurizing the attributes may utilize dimension reduction technique(s) (e.g., principal component analysis) and/or other clustering techniques (e.g., an elliptic envelope technique). In another example, the attributes may be featurized using bit arrays. In yet another example, the attributes may be featurized using categorical variables. In an example implementation, the featurization logic 412 featurizes the attributes of the access requests 428 in the subsets to provide features 434, which are numerical representations of the attributes. In accordance with this embodiment, the subsets of the access requests are clustered into the respective clusters at step 202 based at least on the features. For instance, the subsets of the access requests may be clustered into the respective clusters at step 202 based at least on relationships between the features. In an example implementation, the clustering logic 414 clusters the subsets of the access requests 428 into the respective clusters based at least on the features 434.

In an aspect of this embodiment, featurizing the attributes of the access requests in the subsets includes assigning a numeric or textual value to each attribute to provide a respective feature. For example, each access request may have a first attribute indicating an access token that is used by the respective access request, a second attribute indicating an access action that is requested by the respective access request, and a third attribute indicating a requestor type associated with the respective access request. In accordance with this example, featurizing the attributes of the access requests includes, for each access request, assigning first, second, and third numerical or textual values to the respective first, second, and third attributes of the respective access request to provide respective first, second, and third features for the respective access request. The subsets of the access requests may be clustered based on the numeric or textual values assigned to the attributes of the access requests in each cluster being within a range of numeric or textual values. In accordance with this aspect, numerical or textual values are assigned to attributes of the received access request. For example, a first numerical or textual value may be assigned to a first attribute of the received access request, which indicates an access token that is used by the received access request, to provide a first feature for the received access request. In another example, a second numerical or textual value may be assigned to a second attribute of the received access request, which indicates an access action that is requested by the received access request, to provide a second feature for the received access request. In yet another example, a third numerical or textual value may be assigned to a third attribute of the received access request, which indicates a requestor type associated with the received access request.

In accordance with this aspect, at least the first, second, and third features of each access request in the identified group are compared to at least the first, second, and third features of the received access request to determine that the received access request is received from the access requestor of the designated requestor type and to determine that the received access request uses the designated access token to request performance of an access action that is not included in the scope of the access behavior that is associated with the identified group of the access requests.

Differences between features of access requests may be represented using a single numerical or textual difference value (e.g., by combining the differences between the numeric or textual values of the attributes of the access requests) or using a vector of numeric or textual difference values (e.g., such that each numeric or textual difference value in the vector corresponds to a difference between the numeric or textual values of corresponding attributes of the access requests). The difference between textual values may be represented by a first difference value (e.g., "1") if the textual values are the same, whereas the difference may be represented by a second difference value (e.g., "0") if the textual values are not the same.

In still another example embodiment, the access behavior indicates predicted likelihoods of respective actions to be performed with regard to an arbitrary access request that corresponds to the designated requestor type and that utilizes the designated access token. In accordance with this embodiment, the method of flowchart 200 further includes determining (e.g., defining) the scope of the access behavior that is associated with the identified group of the access requests by taking into consideration the predicted likelihoods of the respective actions to be performed with regard to the arbitrary access request. In an example implementation, the access behavior logic 422 determines the scope of the access behavior that is associated with the identified group of the access requests by taking into consideration the predicted likelihoods of the respective actions to be performed with regard to the arbitrary access request.

In another example embodiment, the method of flowchart 200 includes one or more of the steps shown in flowchart 300 of FIG. 3. As shown in FIG. 3, the method of flowchart 300 begins at step 302. In step 302, a determination is made whether an amount by which a scope of permissions that are defined by the designated access token exceeds the scope of the access behavior that is associated with the identified group of the access requests is greater than or equal to a threshold amount. If the amount is greater than or equal to the threshold amount, flow continues to step 304. Otherwise, flow continues to step 306. In an example implementation, the recommendation logic 424 determines whether the amount by which the scope of permissions that are defined by the designated access token exceeds the scope of the access behavior that is associated with the identified group of the access requests is greater than or equal to a threshold amount. In an aspect, the recommendation logic 424 analyzes access token information 432 to determine the scope of the permissions defined by the designated access token. In accordance with this aspect, the recommendation logic 424 analyzes the behavior information 442 to determine the scope of the access behavior associated with the identified group of the access requests. In further accordance with this aspect, the recommendation logic 424 compares the scope of the permissions defined by the designated access token, as indicated by the access token information 432, and the scope of the access behavior associated with the identified group of the access requests, as indicated by the behavior information 442, to determine whether the amount by which the scope of permissions defined by the designated access token exceeds the scope of the access behavior associated with the identified group of the access requests is greater than or equal to the threshold amount.

In an example implementation of this embodiment, the determination at step 302 includes determining whether the amount by which the scope of the permissions that are defined by the designated access token exceeds the scope of the access behavior that is associated with the identified group of the access requests is greater than the threshold amount. For instance, the threshold amount may be zero. In accordance with this implementation, if the amount is greater than the threshold amount, flow continues to step 304; otherwise, flow continues to step 306.

In another example implementation of this embodiment, the determination at step 302 includes determining whether an amount by which a first value, which represents the scope of the access behavior, (e.g., an inversion of the scope of the access behavior) exceeds a second value, which represents the scope of the permissions that are defined by the designated access token, (e.g., an inversion of the scope of the permissions) is greater than or equal to the threshold amount. In accordance with this implementation, if the amount is greater than or equal to the threshold amount, flow continues to step 304; otherwise, flow continues to step 306.

In yet another example implementation of this embodiment, the determination at step 302 includes determining whether an amount by which a first value, which represents the scope of the access behavior, (e.g., an inversion of the scope of the access behavior) exceeds a second value, which represents the scope of the permissions that are defined by the designated access token, (e.g., an inversion of the scope of the permissions) is greater than the threshold amount. In accordance with this implementation, if the amount is greater than the threshold amount, flow continues to step 304; otherwise, flow continues to step 306.

At step 304, a recommendation to reduce the scope of the permissions with regard to the designated requestor type is provided. In an example implementation, the recommendation logic 424 provides a recommendation 448, which recommends reducing the scope of the permissions with regard to the designated requestor type. Upon completion of step 304, flow continues to step 308.

At step 306, the recommendation to reduce the scope of the permissions with regard to the designated requestor type is not provided. In an example implementation, the recommendation logic 424 does not provide the recommendation 448. Upon completion of step 306, flowchart 300 ends.

At step 308, a determination is made whether the scope of the permissions is reduced with regard to the designated requestor type within a period of time after the recommendation is provided. If the scope of the permissions is not reduced with regard to the designated requestor type within the period of time after the recommendation is provided, flow continues to step 310. Otherwise, flow continues to step 312. In an example implementation, the recommendation logic 424 determines whether the scope of the permissions is reduced with regard to the designated requestor type within the period of time after the recommendation 448 is provided. In accordance with this implementation, the recommendation logic 424 is configured to generate a monitoring instruction 444 based on the scope of the permissions not being reduced with regard to the designated requestor type within the period of time after the recommendation 448 is provided. The monitoring instruction 444 instructs the monitoring logic 426 to initiate monitoring of access requests corresponding to the designated requestor type. For instance, monitoring the access requests that correspond to the designated requestor type may include flagging access requests that correspond to the designated requestor type for further analysis, collecting information about attributes of the access requests that correspond to the designated requestor type, determining whether the access requests that correspond to the designated requestor type utilize the designated access token, and/or comparing the access action requested by each access request that corresponds to the designated requestor type and the scope of the access behavior that is associated with the identified group of the access requests to determine whether the access action is included in the scope of the access behavior. In further accordance with this implementation, the recommendation logic 424 is further configured to not generate the monitoring instruction 444 based on the scope of the permissions being reduced with regard to the designated requestor type within the period of time after the recommendation 448 is provided.

At step 310, monitoring of access requests corresponding to the designated requestor type is initiated. In an example implementation, the monitoring logic 426 initiates monitoring of the access requests 428 that correspond to the designated requestor type. For instance, the monitoring logic 426 may initiate the monitoring of the access requests 428 that correspond to the designated requestor type based on receipt of the monitoring instruction 444 (e.g., based on the monitoring instruction 444 instructing the monitoring logic 426 to initiate the monitoring). Upon completion of step 310, flowchart 300 ends.

In an aspect, the received access request is determined to be the malicious access request at step 206 in FIG. 2 as a result of the monitoring being initiated at step 310. In another aspect, initiating the monitoring at step 310 includes setting a trigger that is configured to cause the security action to be performed at step 208 in FIG. 2 in response to (e.g., based on) an access request that is received from an access requestor of the designated requestor type requesting performance of an access action that is not included in the scope of the access behavior that is associated with the identified group of the access requests.

At step 312, the monitoring of the access requests corresponding to the designated requestor type is not initiated. In an example implementation, the monitoring logic 426 does not initiate the monitoring of the access requests 428 that correspond to the designated requestor type (e.g., based on the monitoring instruction 444 not being received). Upon completion of step 312, flowchart 300 ends.

It will be recognized that the computing system 400 may not include one or more of the cluster-based security logic 408, the featurization logic 412, the clustering logic 414, the distinguishing logic 416, the maliciousness determination logic 418, the security action logic 420, the access behavior logic 422, the recommendation logic 424, and/or the monitoring logic 426. Furthermore, the computing system 400 may include components in addition to or in lieu of the cluster-based security logic 408, the featurization logic 412, the clustering logic 414, the distinguishing logic 416, the maliciousness determination logic 418, the security action logic 420, the access behavior logic 422, the recommendation logic 424, and/or the monitoring logic 426.

Figure 5:
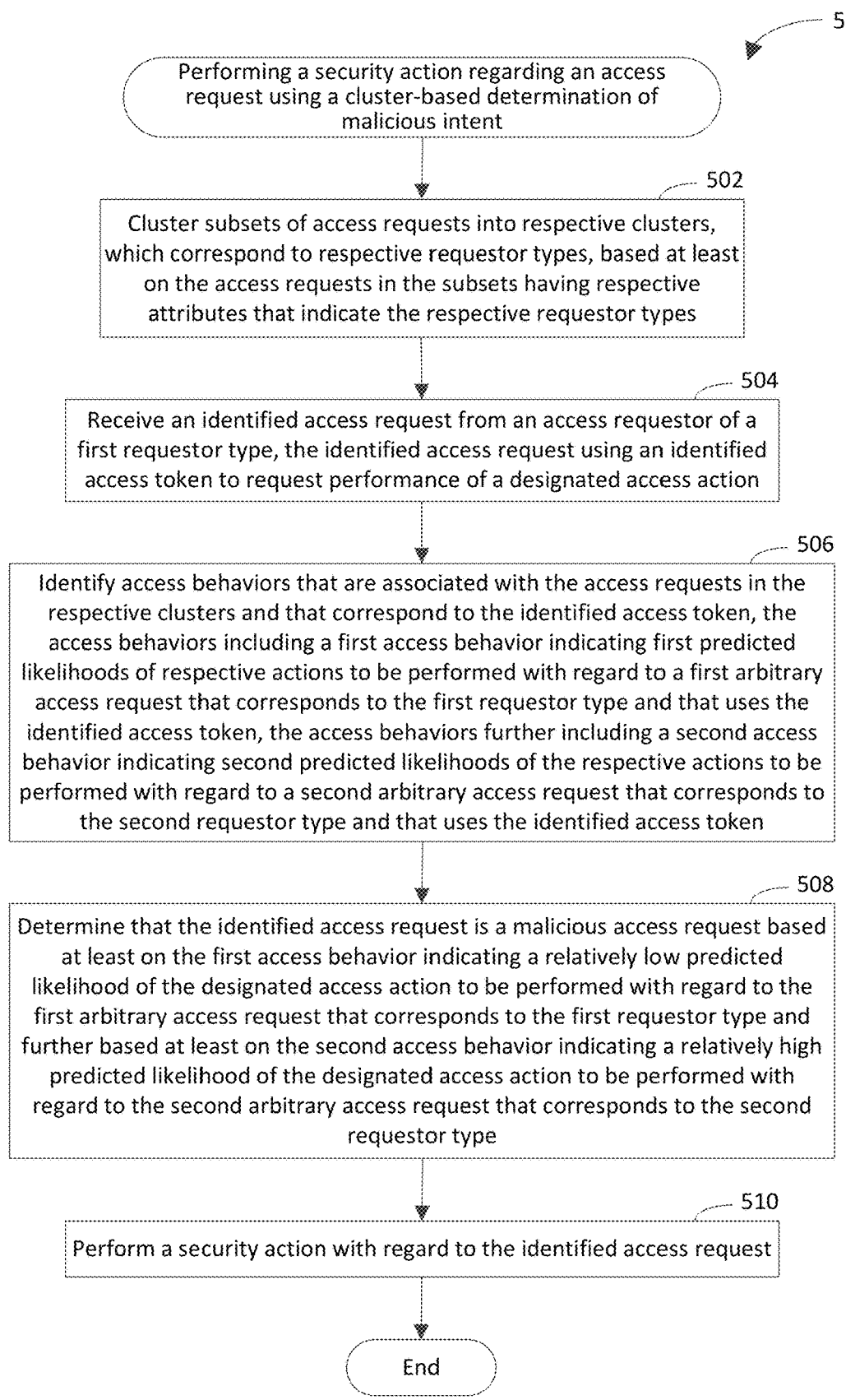
Figure 6:
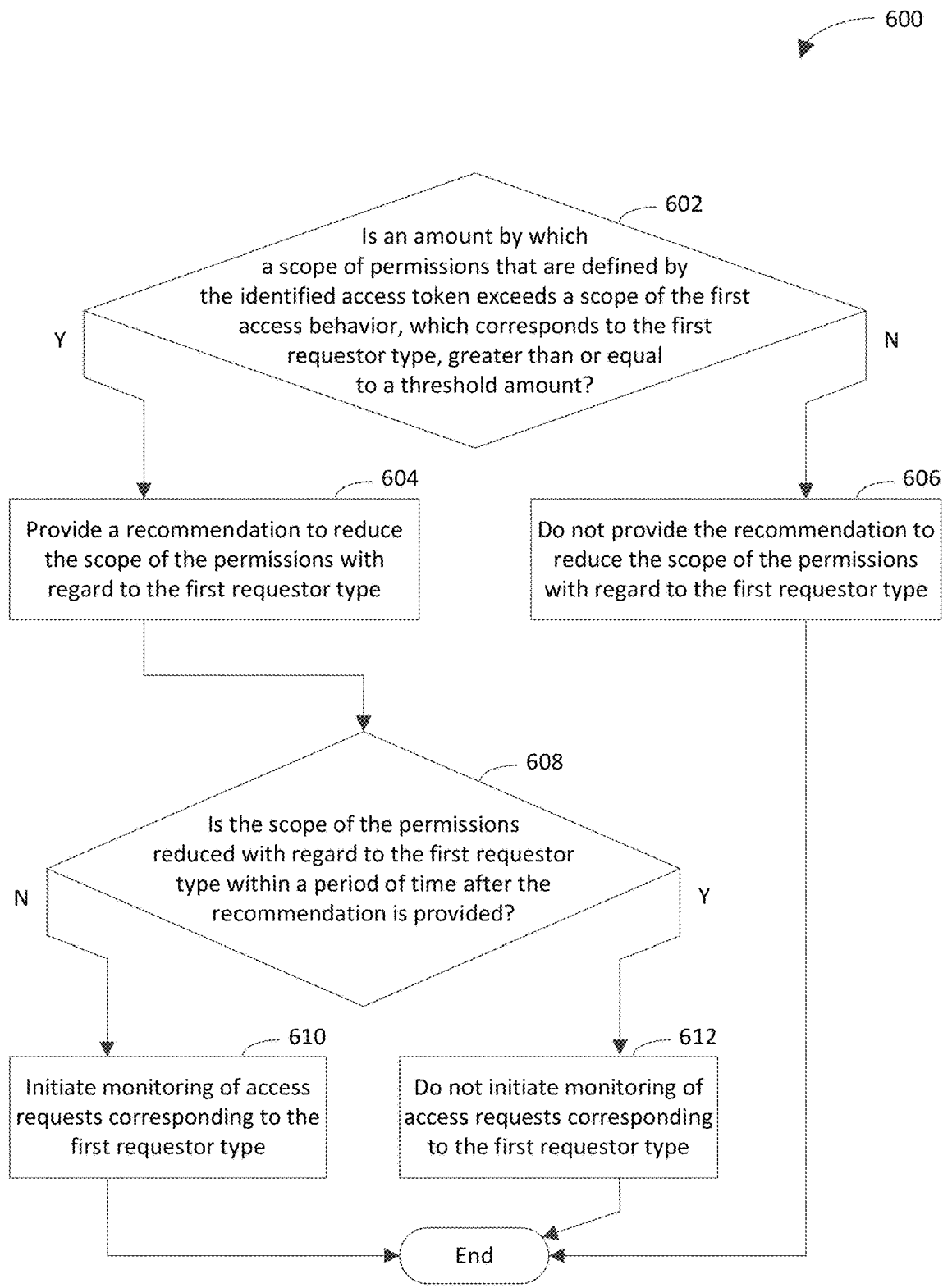
Figure 7:
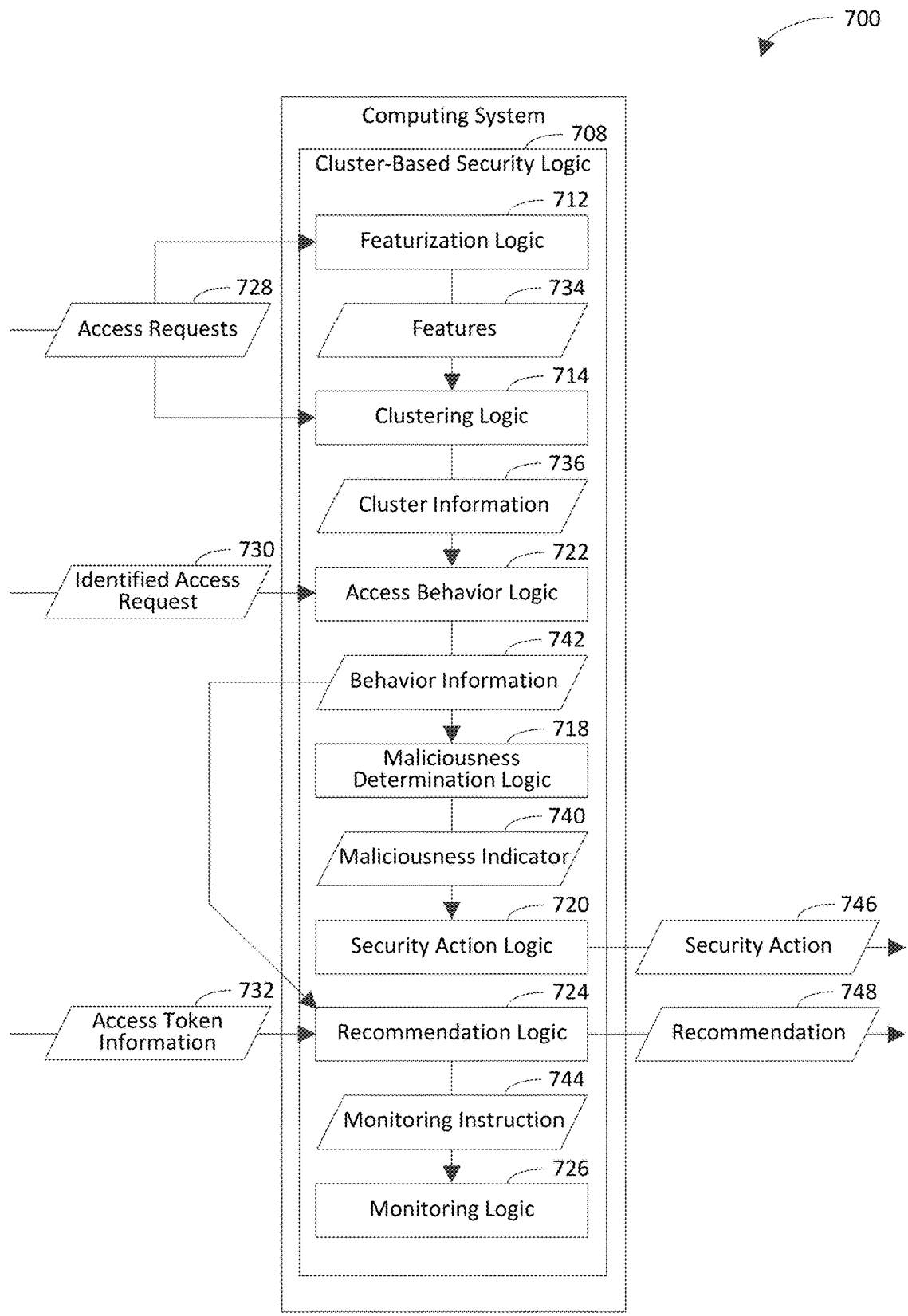

FIGS. 5-6 depict flowcharts 500 and 600 of example methods for performing a security action regarding an access request using a cluster-based determination of malicious intent in accordance with embodiments. Flowcharts 500 and 600 may be performed by the first server(s) 106A shown in FIG. 1, for example. For illustrative purposes, flowcharts 500 and 600 are described with respect to computing system 700 shown in FIG. 7, which is another example implementation of the first server(s) 106A. As shown in FIG. 7, the computing system 700 includes cluster-based security logic 708. The cluster-based security logic 708 includes featurization logic 712, clustering logic 714, maliciousness determination logic 718, security action logic 720, access behavior logic 722, recommendation logic 724, and monitoring logic 726. Further structural and operational embodiments will be apparent to persons skilled in the relevant art(s) based on the discussion regarding flowcharts 500 and 600.

As shown in FIG. 5, the method of flowchart 500 begins at step 502. In step 502, subsets of access requests are clustered into respective clusters, which correspond to respective requestor types, based at least on the access requests in the subsets having respective attributes that indicate the respective requestor types. The access requests request access to cloud resources. Some examples of an attribute are described above with reference to step 202 of FIG. 2. In an aspect, the subsets of the access requests are clustered into the respective clusters at step 202 using sampling. In an example implementation, the clustering logic 714 clusters subsets of access requests 728 into the respective clusters based at least on the access requests 728 in the subsets having respective attributes that indicate the respective requestor types. For example, the clustering logic 714 may cluster a first subset of the access requests 728 into a first cluster based on the access requests 728 that are included in the first subset having a first attribute that indicates a first requestor type; the clustering logic 714 may cluster a second subset of the access requests 728 into a second cluster based on the access requests 728 that are included in the second subset having a second attribute that indicates a second requestor type, and so on. Each of the access requests 728 requests access to a cloud resource. The clustering logic 714 generates cluster information 736 to identify each of the clusters and to indicate (e.g., specify) which of the access requests 728 are clustered into each cluster. The cluster information 736 may indicate other attributes of the access requests 728, as well. For instance, the cluster information 736 may indicate which access tokens are used by the respective access requests 728, the requestor type associated with each of the access tokens 728, access actions that are requested by the respective access requests 728, and so on.

In an example embodiment, the subsets of the access requests are clustered into the respective clusters at step 502 based at least on the access requests in the subsets being initiated by sources having IP addresses in respective ranges of IP addresses that indicate the respective requestor types. For instance, a first subset of the access requests may be clustered into a first cluster based at least on the access requests in the first subset being initiated by sources having IP addresses in a first IP address range associated with a first requestor type; a second subset of the access requests may be clustered into a second cluster based at least on the access requests in the second subset being initiated by sources having IP addresses in a second IP address range associated with a second requestor type, and so on.

In another example embodiment, the subsets of the access requests are clustered into the respective clusters at step 502 based at least on the subsets of the access requests having respective referrer attributes that indicate respective intermediate entities that correspond to the respective requestor types. For instance, a first subset of the access requests may be clustered into a first cluster based at least on the access requests in the first subset having a first referrer attribute that indicates a first intermediate entity that corresponds to a first requestor type; a second subset of the access requests may be clustered into a second cluster based at least on the access requests in the second subset having a second referrer attribute that indicates a second intermediate entity that corresponds to a second requestor type, and so on. An intermediate entity is an entity that is between a source that initiates an access request and a target to which the access request is directed.

In yet another example embodiment, the subsets of the access requests are clustered into the respective clusters at step 502 based at least on the access requests in the subsets being received from user-agents that indicate the respective requestor types. For instance, a first subset of the access requests may be clustered into a first cluster based at least on the access requests in the first subset being received from user-agents corresponding to a first requestor type; a second subset of the access requests may be clustered into a second cluster based at least on the access requests in the second subset being received from user-agents corresponding to a second requestor type, and so on. A user-agent from which an access request is received is an entity that provides the access request on behalf of a user (i.e., human). Examples of a user-agent include but are not limited to a web browser, a specific version of a web browser, and web crawler. A web crawler is an Internet bot that systematically browses the Word Wide Web (WWW).

At step 504, an identified access request is received from an access requestor of a first requestor type. The identified access request uses an identified access token to request performance of a designated access action. In an example implementation, the access behavior logic 722 receives an identified access request 730 from the access requestor of the first requestor type. The identified access request 730 uses the identified access token to request performance of the designated access action. The access behavior logic 722 generates behavior information 742 to indicate the designated access action.

At step 506, access behaviors that are associated with the access requests in the respective clusters and that correspond to the identified access token are identified. The access behaviors include a first access behavior indicating first predicted likelihoods of respective actions to be performed with regard to a first arbitrary access request that corresponds to the first requestor type and that uses the identified access token. The access behaviors further include a second access behavior indicating second predicted likelihoods of the respective actions to be performed with regard to a second arbitrary access request that corresponds to the second requestor type and that uses the identified access token. In an example implementation, the access behavior logic 742 identifies the access behaviors that are associated with the access requests in the respective clusters and that correspond to the identified access token. The access behavior logic 722 configures the behavior information 742 to indicate at least the first access behavior (e.g., including the first predicted likelihoods) and the second access behavior (e.g., including the second predicted likelihoods). For instance, the access behavior logic 722 may configure the behavior information 742 to indicate all of the access behaviors that are associated with the access requests in the respective clusters and that correspond to the identified access token.

In a modeling aspect, the access behavior logic 722 generates a probabilistic model that models the access behaviors. For example, the probabilistic model may indicate probabilities of respective actions to be performed with regard to arbitrary access requests corresponding to the various requestor types using the identified access token. In accordance with this example, the probabilistic model may indicate confidences in the probabilities. In accordance with the modeling aspect, the behavior information 742 may include the probabilistic model or information regarding the probabilistic model.

At step 508, a determination is made that the identified access request is a malicious access request based at least on the first access behavior indicating a relatively low predicted likelihood of the designated access action to be performed with regard to the first arbitrary access request that corresponds to the first requestor type and further based at least on the second access behavior indicating a relatively high predicted likelihood of the designated access action to be performed with regard to the second arbitrary access request that corresponds to the second requestor type. In an example implementation, the maliciousness determination logic 718 determines that the identified access request 730 is a malicious access request based at least on the first access behavior indicating the relatively low predicted likelihood of the designated access action to be performed with regard to the first arbitrary access request that corresponds to the first requestor type and further based at least on the second access behavior indicating the relatively high predicted likelihood of the designated access action to be performed with regard to the second arbitrary access request that corresponds to the second requestor type. For example, the maliciousness determination logic 718 may analyze the behavior information 742 to identify the designated access action, which is requested by the identified access request 730, and the access behaviors, which are associated with the access requests in the respective clusters and which correspond to the identified access token. In accordance with this example, the maliciousness determination logic 718 may compare the designated access action requested by the identified access request 730 to at least the first and second access behaviors, as indicated by the behavior information 742, to determine that the first access behavior indicates the relatively low predicted likelihood of the designated access action to be performed with regard to the first arbitrary access request that corresponds to the first requestor type and that the second access behavior indicates the relatively high predicted likelihood of the designated access action to be performed with regard to the second arbitrary access request that corresponds to the second requestor type.

In accordance with the modeling aspect mentioned above with regard to step 506, the maliciousness determination logic 718 provides information that indicates the designated access action as an input to the probabilistic model and receives, as an output of the probabilistic model, a first prediction, indicating the relatively low predicted likelihood of the designated access action to be performed with regard to the first arbitrary access request that corresponds to the first requestor type, and a second prediction, indicating the relatively high predicted likelihood of the designated access action to be performed with regard to the second arbitrary access request that corresponds to the second requestor type. The maliciousness determination logic 718 generates a maliciousness indicator 740 to indicate that the identified access request 730 is a malicious access request.

In an example embodiment, the identified access request is determined to be the malicious access request at step 508 based at least on an amount by which the relatively high predicted likelihood of the designated access action to be performed with regard to the second arbitrary access request that corresponds to the second requestor type exceeds the relatively low predicted likelihood of the designated access action to be performed with regard to the first arbitrary access request that corresponds to the first requestor type being greater than or equal to a threshold amount.

In another example embodiment, the identified access request is determined to be the malicious access request at step 508 based at least on the relatively low predicted likelihood of the designated access action to be performed with regard to the first arbitrary access request that corresponds to the first requestor type being less than or equal to a first likelihood threshold and further based at least on the relatively high predicted likelihood of the designated access action to be performed with regard to the second arbitrary access request that corresponds to the second requestor type being greater than or equal to a second likelihood threshold. In an aspect, the second likelihood threshold is greater than the first likelihood threshold.

In yet another example embodiment, the identified access request is determined to be the malicious access request at step 508 even though the designated access action is within a scope of permissions that are defined by the identified access token. In an aspect, the permissions are indicated by an identifier associated with the identified access token. For example, the permissions may be specified in a hash that identifies the identified access token. In another example, the identifier may be a uniform resource identifier (URI), such as a uniform resource name (URN) or a uniform resource locator (URL).

At step 510, as a result of determining that the identified access request is the malicious access request, a security action is performed with regard to the identified access request. In an example implementation, the security action logic 720 performs a security action 746 with regard to the identified access request 730 based on receipt of the maliciousness indicator 740 (e.g., based on the maliciousness indicator 740 indicating that the identified access request 730 is malicious).

In an example embodiment, performing the security action at step 510 includes preventing the designated access action from being performed.

In another example embodiment, performing the security action at step 510 includes providing a security alert that indicates that the designated access action has a relatively low likelihood of being requested by an access requestor of the first requestor type. For instance, the security alert may specify the relatively low likelihood. In an aspect, the security alert is provided in real-time (e.g., on-the-fly). In accordance with this aspect, providing the security alert may be triggered by a determination of the relatively low predicted likelihood associated with the first arbitrary access request and/or the relatively high predicted likelihood associated with the second arbitrary access request. In another aspect, providing the security alert includes opening a support ticket that indicates that the designated access action has a relatively low likelihood of being requested by an access requestor of the first requestor type.

In some example embodiments, one or more steps 502, 504, 506, 508, and/or 510 of flowchart 500 may not be performed. Moreover, steps in addition to or in lieu of steps 502, 504, 506, 508, and/or 510 may be performed. For instance, in an example embodiment, the method of flowchart 500 further includes identifying the first access behavior, which corresponds to the first requestor type, and the second access behavior, which corresponds to the second requestor type, by analyzing a data plane log that describes accesses of end users to a cloud resource using the identified access token. In an aspect, a data plane log includes information about packets that are processed by a data plane. A data plane is a component of a router that examines an incoming packet and forwards the incoming packet to a target destination in a network. Examples of a data plane include but are not limited to an Ethernet network, a Wi-Fi network, a cellular network, and a satellite network. In an example, the data plane log may include names of files that are uploaded to a server, sizes of the files, IP addresses from which the files are uploaded, and so on. In an example implementation, the access behavior logic 722 identifies the first access behavior and the second access behavior by analyzing the data plane log.

In another example embodiment, the method of flowchart 500 further includes identifying the first access behavior, which corresponds to the first requestor type, and the second access behavior, which corresponds to the second requestor type, by analyzing a token management service log that describes administrative operations that are performed using the identified access token. An administrative operation is an operation that defines how information is to be managed, routed, and/or processed. For instance, the administrative operation may be performed by a service or an administrator. An example of an administrative operation is the creation of an access token (e.g., to be used by access requests). The token management service log includes information generated and/or stored by a token management service. A token management service is a service that manages tokens (e.g., access tokens). In an example implementation, the access behavior logic 722 identifies the first access behavior and the second access behavior by analyzing the token management service log.

In yet another example embodiment, the method of flowchart 500 further includes featurizing the attributes of the access requests in the subsets to provide features, which are numerical representations of the attributes. For instance, featurizing the attributes may include converting data (e.g., text data, graph data, or time-series data) associated with the attributes into a numerical vector. Featurizing the attributes may utilize K-means featurization to create a compressed spatial index of the data, which can be fed into a model. In an example implementation, the featurization logic 712 featurizes the attributes of the access requests 728 in the subsets to provide features 734, which are numerical representations of the attributes. In accordance with this embodiment, the subsets of the access requests are clustered into the respective clusters at step 502 based at least on the features. For instance, the subsets of the access requests may be clustered into the respective clusters at step 502 based at least on relationships between the features. In an example implementation, the clustering logic 714 clusters the subsets of the access requests 728 into the respective clusters based at least on the features 734.

In another example embodiment, the method of flowchart 500 includes one or more of the steps shown in flowchart 600 of FIG. 6. As shown in FIG. 6, the method of flowchart 600 begins at step 602. In step 302, a determination is made whether an amount by which a scope of permissions that are defined by the identified access token exceeds a scope of the first access behavior, which corresponds to the first request type, is greater than or equal to a threshold amount. If the amount is greater than or equal to the threshold amount, flow continues to step 604. Otherwise, flow continues to step 606. In an example implementation, the recommendation logic 724 determines whether the amount by which the scope of permissions that are defined by the identified access token exceeds the scope of the first access behavior is greater than or equal to the threshold amount. In an aspect, the recommendation logic 724 analyzes access token information 732 to determine the scope of the permissions defined by the identified access token. In accordance with this aspect, the recommendation logic 724 analyzes the behavior information 742 to determine the scope of the first access behavior. In further accordance with this aspect, the recommendation logic 724 compares the scope of the permissions defined by the identified access token, as indicated by the access token information 732, and the scope of the first access behavior, as indicated by the behavior information 742, to determine whether the amount by which the scope of permissions defined by the identified access token exceeds the scope of the first access behavior is greater than or equal to the threshold amount.

At step 604, a recommendation to reduce the scope of the permissions with regard to the first requestor type is provided. In an example implementation, the recommendation logic 724 provides a recommendation 748, which recommends reducing the scope of the permissions with regard to the first requestor type. Upon completion of step 604, flow continues to step 608.

At step 606, the recommendation to reduce the scope of the permissions with regard to the first requestor type is not provided. In an example implementation, the recommendation logic 724 does not provide the recommendation 748. Upon completion of step 606, flowchart 600 ends.

At step 608, a determination is made whether the scope of the permissions is reduced with regard to the first requestor type within a period of time after the recommendation is provided. If the scope of the permissions is not reduced with regard to the first requestor type within the period of time after the recommendation is provided, flow continues to step 610. Otherwise, flow continues to step 612. In an example implementation, the recommendation logic 724 determines whether the scope of the permissions is reduced with regard to the first requestor type within the period of time after the recommendation 748 is provided. In accordance with this implementation, the recommendation logic 724 is configured to generate a monitoring instruction 744 based on the scope of the permissions not being reduced with regard to the first requestor type within the period of time after the recommendation 748 is provided. The monitoring instruction 744 instructs the monitoring logic 726 to initiate monitoring of access requests corresponding to the first requestor type. For instance, monitoring the access requests that correspond to the first requestor type may include flagging access requests that correspond to the first requestor type for further analysis, collecting information about attributes of the access requests that correspond to the first requestor type, and/or determining whether the access requests that correspond to the first requestor type utilize the identified access token. In further accordance with this implementation, the recommendation logic 724 is further configured to not generate the monitoring instruction 744 based on the scope of the permissions being reduced with regard to the first requestor type within the period of time after the recommendation 748 is provided.

At step 610, monitoring of access requests corresponding to the first requestor type is initiated. In an example implementation, the monitoring logic 726 initiates monitoring of the access requests 728 that correspond to the first requestor type. For instance, the monitoring logic 726 may initiate the monitoring of the access requests 728 that correspond to the first requestor type based on receipt of the monitoring instruction 744 (e.g., based on the monitoring instruction 744 instructing the monitoring logic 726 to initiate the monitoring). Upon completion of step 610, flowchart 600 ends.

In an aspect, the identified access request is determined to be the malicious access request at step 508 in FIG. 5 as a result of the monitoring being initiated at step 610. In another aspect, initiating the monitoring at step 610 includes setting a trigger that is configured to cause the security action to be performed at step 510 in FIG. 5 in response to (e.g., based on) a determination of the relatively low predicted likelihood associated with the first arbitrary access request (e.g., the relatively low predicted likelihood associated with the first arbitrary access request being less than or equal to a first threshold) and/or the relatively high predicted likelihood associated with the second arbitrary access request (e.g., the relatively high predicted likelihood associated with the second arbitrary access request being greater than or equal to a second threshold that is greater than the first threshold).

At step 612, the monitoring of the access requests corresponding to the first requestor type is not initiated. In an example implementation, the monitoring logic 726 does not initiate the monitoring of the access requests 728 that correspond to the first requestor type (e.g., based on the monitoring instruction 744 not being received). Upon completion of step 612, flowchart 600 ends.

It will be recognized that the computing system 700 may not include one or more of the cluster-based security logic 708, the featurization logic 712, the clustering logic 714, the maliciousness determination logic 718, the security action logic 720, the access behavior logic 722, the recommendation logic 724, and/or the monitoring logic 726. Furthermore, the computing system 700 may include components in addition to or in lieu of the cluster-based security logic 708, the featurization logic 712, the clustering logic 714, the maliciousness determination logic 718, the security action logic 720, the access behavior logic 722, the recommendation logic 724, and/or the monitoring logic 726.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the cluster-based security logic 108, the cluster-based security logic 408, the featurization logic 412, the clustering logic 414, the distinguishing logic 416, the maliciousness determination logic 418, the security action logic 420, the access behavior logic 422, the recommendation logic 424, the monitoring logic 426, the cluster-based security logic 708, the featurization logic 712, the clustering logic 714, the maliciousness determination logic 718, the security action logic 720, the access behavior logic 722, the recommendation logic 724, the monitoring logic 726, flowchart 200, flowchart 300, flowchart 500, and/or flowchart 600 may be implemented in hardware, software, firmware, or any combination thereof.

For example, any one or more of the cluster-based security logic 108, the cluster-based security logic 408, the featurization logic 412, the clustering logic 414, the distinguishing logic 416, the maliciousness determination logic 418, the security action logic 420, the access behavior logic 422, the recommendation logic 424, the monitoring logic 426, the cluster-based security logic 708, the featurization logic 712, the clustering logic 714, the maliciousness determination logic 718, the security action logic 720, the access behavior logic 722, the recommendation logic 724, the monitoring logic 726, flowchart 200, flowchart 300, flowchart 500, and/or flowchart 600 may be implemented, at least in part, as computer program code configured to be executed in one or more processors.

In another example, any one or more of the cluster-based security logic 108, the cluster-based security logic 408, the featurization logic 412, the clustering logic 414, the distinguishing logic 416, the maliciousness determination logic 418, the security action logic 420, the access behavior logic 422, the recommendation logic 424, the monitoring logic 426, the cluster-based security logic 708, the featurization logic 712, the clustering logic 714, the maliciousness determination logic 718, the security action logic 720, the access behavior logic 722, the recommendation logic 724, the monitoring logic 726, flowchart 200, flowchart 300, flowchart 500, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
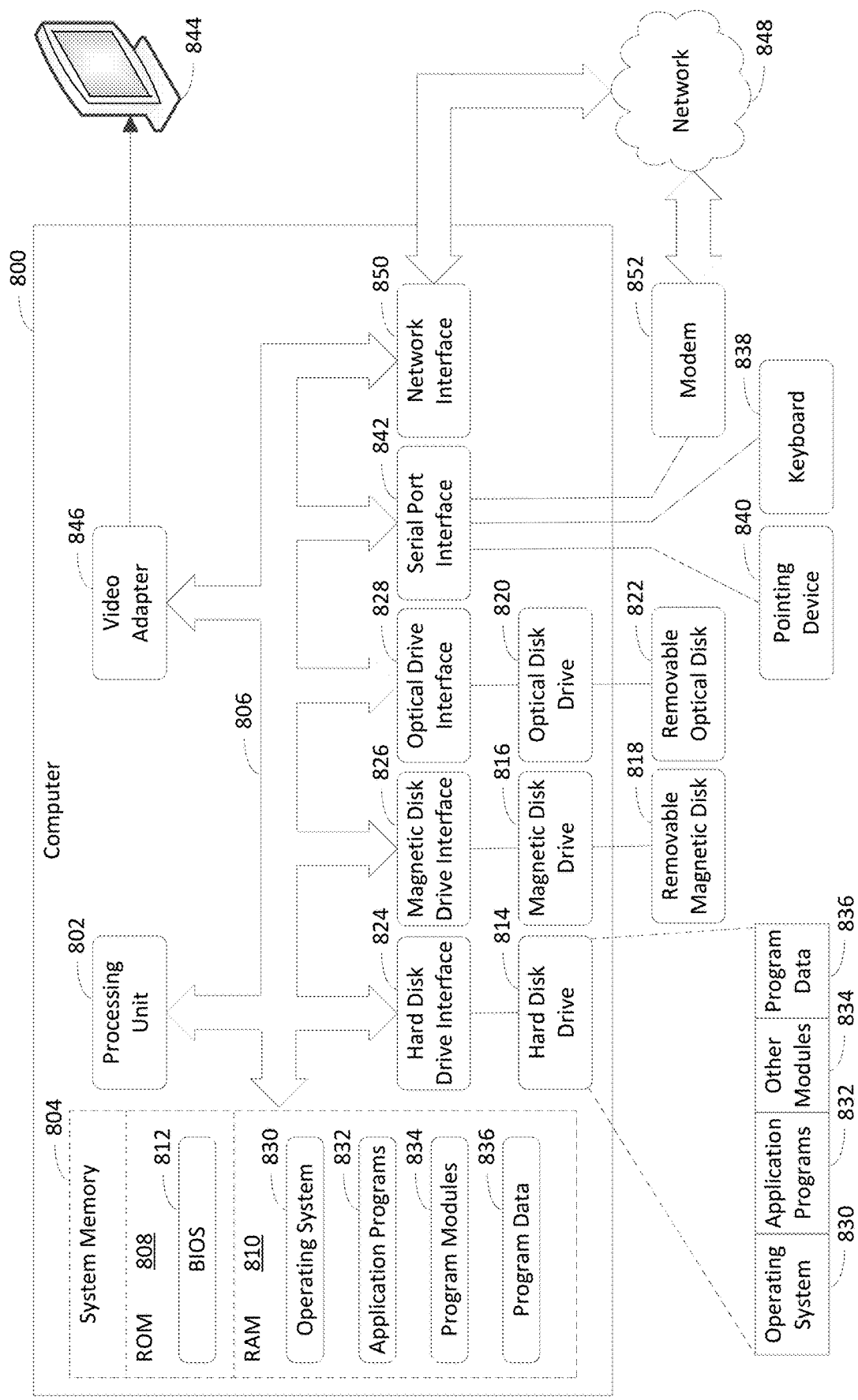
FIG. 8 depicts an example computer in which embodiments may be implemented.

II. Further Discussion of Some Example Embodiments (A1) A first example system (FIG. 1, 102A-102M, 106A-106N; FIG. 4, 400; FIG. 8, 800) comprises memory (FIG. 8, 804, 808, 810) and a processing system (FIG. 8, 802) coupled to the memory. The processing system is configured to cluster (FIG. 2, 202) subsets of access requests (FIG. 4, 428) into respective clusters, which correspond to respective requestor types, based at least on the access requests in the subsets having respective attributes that indicate the respective requestor types. The access requests request access to cloud resources (FIG. 1, 110). The processing system is further configured to distinguish (FIG. 2, 204) an identified group of the access requests from the other access requests based at least on the identified group being included in a designated cluster, which corresponds to a designated requestor type, and further based at least on the access requests that are included in the identified group utilizing a designated access token. The processing system is further configured to determine (FIG. 2, 206) that a received access request (FIG. 4, 430) is a malicious access request based at least on the received access request being received from an access requestor of the designated requestor type and further based at least on the received access request using the designated access token to request performance of an access action that is not included in a scope of access behavior that is associated with the identified group of the access requests. The processing system is further configured to, as a result of determining that the received access request is the malicious access request, perform (FIG. 2, 208) a security action (FIG. 4, 446) with regard to the received access request.

(A2) In the example system of A1, wherein the processing system is configured to: determine that the received access request is the malicious access request even though the access action is within a scope of permissions that are defined by the designated access token.

(A3) In the example system of any of A1-A2, wherein the processing system is configured to: based at least on an amount by which a scope of permissions that are defined by the designated access token exceeds the scope of the access behavior that is associated with the identified group of the access requests being greater than or equal to a threshold amount, provide a recommendation to reduce the scope of the permissions with regard to the designated requestor type; based at least on the scope of the permissions not being reduced with regard to the designated requestor type within a period of time after the recommendation is provided, initiate monitoring of access requests corresponding to the designated requestor type; and determine that the received access request is the malicious access request as a result of the monitoring being initiated.

(A4) In the example system of any of A1-A3, wherein the processing system is configured to: cluster the subsets of the access requests into the respective clusters based at least on the access requests in the subsets being initiated by sources having IP addresses in respective ranges of IP addresses that indicate the respective requestor types.

(A5) In the example system of any of A1-A4, wherein the processing system is configured to: cluster the subsets of the access requests into the respective clusters based at least on the subsets of the access requests having respective referrer attributes that indicate respective intermediate entities that correspond to the respective requestor types.

(A6) In the example system of any of A1-A5, wherein the processing system is configured to: cluster the subsets of the access requests into the respective clusters based at least on the access requests in the subsets being received from user-agents that indicate the respective requestor types.

(A7) In the example system of any of A1-A6, wherein the processing system is further configured to: identify the access behavior that is associated with the identified group of the access requests by analyzing a data plane log that describes accesses of end users to a cloud resource using the designated access token.

(A8) In the example system of any of A1-A7, wherein the processing system is further configured to: identify the access behavior that is associated with the identified group of the access requests by analyzing a token management service log that describes administrative operations that are performed using the designated access token.

(A9) In the example system of any of A1-A8, wherein the processing system is configured to: as the result of determining that the received access request is the malicious access request, perform the security action by preventing the access action from being performed.

(A10) In the example system of any of A1-A9, wherein the processing system is configured to: as the result of determining that the received access request is the malicious access request, perform the security action by providing a security alert that indicates that the access action is not included in the scope of the access behavior that is associated with the identified group of the access requests.

(A11) In the example system of any of A1-A10, wherein the processing system is configured to: featurize the attributes of the access requests in the subsets to provide features, which are numerical representations of the attributes; and cluster the subsets of the access requests into the respective clusters based at least on the features.

(A12) In the example system of any of A1-A11, wherein the access behavior indicates predicted likelihoods of respective actions to be performed with regard to an arbitrary access request that corresponds to the designated requestor type and that utilizes the designated access token; and wherein the processing system is further configured to: determine the scope of the access behavior that is associated with the identified group of the access requests by taking into consideration the predicted likelihoods of the respective actions to be performed with regard to the arbitrary access request.

(B1) A second example system (FIG. 1, 102A-102M, 106A-106N; FIG. 7, 700; FIG. 8, 800) comprises memory (FIG. 8, 804, 808, 810) and a processing system (FIG. 8, 802) coupled to the memory. The processing system is configured to cluster (FIG. 5, 502) subsets of access requests (FIG. 7, 728) into respective clusters, which correspond to respective requestor types, based at least on the access requests in the subsets having respective attributes that indicate the respective requestor types. The access requests request access to cloud resources (FIG. 1, 110). The processing system is further configured to receive (FIG. 5, 504) an identified access request (FIG. 7, 730) from an access requestor of a first requestor type. The identified access request uses an identified access token to request performance of a designated access action. The processing system is further configured to identify (FIG. 5, 506) access behaviors that are associated with the access requests in the respective clusters and that correspond to the identified access token. The access behaviors include a first access behavior indicating first predicted likelihoods of respective actions to be performed with regard to a first arbitrary access request that corresponds to the first requestor type and that uses the identified access token. The access behaviors further include a second access behavior indicating second predicted likelihoods of the respective actions to be performed with regard to a second arbitrary access request that corresponds to the second requestor type and that uses the identified access token. The processing system is further configured to determine (FIG. 5, 508) that the identified access request is a malicious access request based at least on the first access behavior indicating a relatively low predicted likelihood of the designated access action to be performed with regard to the first arbitrary access request that corresponds to the first requestor type and further based at least on the second access behavior indicating a relatively high predicted likelihood of the designated access action to be performed with regard to the second arbitrary access request that corresponds to the second requestor type. The processing system is further configured to, as a result of determining that the identified access request is the malicious access request, perform (FIG. 5, 510) a security action (FIG. 7, 746) with regard to the identified access request.

(B2) In the example system of B1, wherein the processing system is configured to: determine that the identified access request is the malicious access request based at least on an amount by which the relatively high predicted likelihood of the designated access action to be performed with regard to the second arbitrary access request that corresponds to the second requestor type exceeds the relatively low predicted likelihood of the designated access action to be performed with regard to the first arbitrary access request that corresponds to the first requestor type being greater than or equal to a threshold amount.

(B3) In the example system of any of B1-B2, wherein the processing system is configured to: determine that the identified access request is the malicious access request based at least on the relatively low predicted likelihood of the designated access action to be performed with regard to the first arbitrary access request that corresponds to the first requestor type being less than or equal to a first likelihood threshold and further based at least on the relatively high predicted likelihood of the designated access action to be performed with regard to the second arbitrary access request that corresponds to the second requestor type being greater than or equal to a second likelihood threshold.

(B4) In the example system of any of B1-B3, wherein the processing system is configured to: determining that the identified access request is the malicious access request even though the designated access action is within a scope of permissions that are defined by the identified access token.

(B5) In the example system of any of B1-B4, wherein the processing system is configured to: based at least on an amount by which a scope of permissions that are defined by the identified access token exceeds a scope of the first access behavior, which corresponds to the first requestor type, being greater than or equal to a threshold amount, provide a recommendation to reduce the scope of the permissions with regard to the first requestor type; based at least on the scope of the permissions not being reduced with regard to the first requestor type within a period of time after the recommendation is provided, initiate monitoring of access requests corresponding to the first requestor type; and determine that the identified access request is the malicious access request as a result of the monitoring being initiated.

(B6) In the example system of any of B1-B5, wherein the processing system is configured to: cluster the subsets of the access requests into the respective clusters based at least on the access requests in the subsets being initiated by sources having IP addresses in respective ranges of IP addresses that indicate the respective requestor types.

(B7) In the example system of any of B1-B6, wherein the processing system is configured to: cluster the subsets of the access requests into the respective clusters based at least on the subsets of the access requests having respective referrer attributes that indicate respective intermediate entities that correspond to the respective requestor types.

(B8) In the example system of any of B1-B7, wherein the processing system is configured to: cluster the subsets of the access requests into the respective clusters based at least on the access requests in the subsets being received from user-agents that indicate the respective requestor types.

(B9) In the example system of any of B1-B8, wherein the processing system is further configured to: identify the first access behavior, which corresponds to the first requestor type, and the second access behavior, which corresponds to the second requestor type, by analyzing a data plane log that describes accesses of end users to a cloud resource using the identified access token.

(B10) In the example system of any of B1-B9, wherein the processing system is further configured to: identify the first access behavior, which corresponds to the first requestor type, and the second access behavior, which corresponds to the second requestor type, by analyzing a token management service log that describes administrative operations that are performed using the identified access token.

(B11) In the example system of any of B1-B10, wherein the processing system is configured to: as the result of determining that the identified access request is the malicious access request, perform the security action by preventing the designated access action from being performed.

(B12) In the example system of any of B1-B11, wherein the processing system is configured to: as the result of determining that the identified access request is the malicious access request, perform the security action by providing a security alert that indicates that the designated access action has a relatively low likelihood of being requested by an access requestor of the first requestor type.

(B13) In the example system of any of B1-B12, wherein the processing system is configured to: featurize the attributes of the access requests in the subsets to provide features, which are numerical representations of the attributes; and cluster the subsets of the access requests into the respective clusters based at least on the features.

(C1) A first example method is implemented by a computing system (FIG. 1, 102A-102M, 106A-106N; FIG. 4, 400; FIG. 8, 800). The method comprises clustering (FIG. 2, 202) subsets of access requests (FIG. 4, 428) into respective clusters, which correspond to respective requestor types, based at least on the access requests in the subsets having respective attributes that indicate the respective requestor types. The access requests request access to cloud resources (FIG. 1, 110). The method further comprises distinguishing (FIG. 2, 204) an identified group of the access requests from the other access requests based at least on the identified group being included in a designated cluster, which corresponds to a designated requestor type, and further based at least on the access requests that are included in the identified group utilizing a designated access token. The method further comprises determining (FIG. 2, 206) that a received access request (FIG. 4, 430) is a malicious access request based at least on the received access request being received from an access requestor of the designated requestor type and further based at least on the received access request using the designated access token to request performance of an access action that is not included in a scope of access behavior that is associated with the identified group of the access requests. The method further comprises, as a result of determining that the received access request is the malicious access request, performing (FIG. 2, 208) a security action (FIG. 4, 446) with regard to the received access request.

(C2) In the method of C1, wherein determining that the received access request is the malicious access request comprises: determining that the received access request is the malicious access request even though the access action is within a scope of permissions that are defined by the designated access token.

(C3) In the method of any of C1-C2, further comprising: based at least on an amount by which a scope of permissions that are defined by the designated access token exceeds the scope of the access behavior that is associated with the identified group of the access requests being greater than or equal to a threshold amount, providing a recommendation to reduce the scope of the permissions with regard to the designated requestor type; and based at least on the scope of the permissions not being reduced with regard to the designated requestor type within a period of time after the recommendation is provided, initiating monitoring of access requests corresponding to the designated requestor type; wherein determining that the received access request is the malicious access request is performed as a result of the monitoring being initiated.

(C4) In the method of any of C1-C3, wherein clustering the subsets of the access requests into the respective clusters comprises: clustering the subsets of the access requests into the respective clusters based at least on the access requests in the subsets being initiated by sources having IP addresses in respective ranges of IP addresses that indicate the respective requestor types.

(C5) In the method of any of C1-C4, wherein clustering the subsets of the access requests into the respective clusters comprises: clustering the subsets of the access requests into the respective clusters based at least on the subsets of the access requests having respective referrer attributes that indicate respective intermediate entities that correspond to the respective requestor types.

(C6) In the method of any of C1-C5, wherein clustering the subsets of the access requests into the respective clusters comprises: clustering the subsets of the access requests into the respective clusters based at least on the access requests in the subsets being received from user-agents that indicate the respective requestor types.

(C7) In the method of any of C1-C6, further comprising: identifying the access behavior that is associated with the identified group of the access requests by analyzing a data plane log that describes accesses of end users to a cloud resource using the designated access token.

(C8) In the method of any of C1-C7, further comprising: identifying the access behavior that is associated with the identified group of the access requests by analyzing a token management service log that describes administrative operations that are performed using the designated access token.

(C9) In the method of any of C1-C8, wherein performing the security action comprises: as the result of determining that the received access request is the malicious access request, preventing the access action from being performed.

(C10) In the method of any of C1-C9, wherein performing the security action comprises: as the result of determining that the received access request is the malicious access request, providing a security alert that indicates that the access action is not included in the scope of the access behavior that is associated with the identified group of the access requests.

(C11) In the method of any of C1-C10, further comprising: featurizing the attributes of the access requests in the subsets to provide features, which are numerical representations of the attributes; wherein clustering the subsets of the access requests comprises: clustering the subsets of the access requests into the respective clusters based at least on the features.

(C12) In the method of any of C1-C11, wherein the access behavior indicates predicted likelihoods of respective actions to be performed with regard to an arbitrary access request that corresponds to the designated requestor type and that utilizes the designated access token; and wherein the method further comprises: determining the scope of the access behavior that is associated with the identified group of the access requests by taking into consideration the predicted likelihoods of the respective actions to be performed with regard to the arbitrary access request.

(D1) A second example method is implemented by a computing system (FIG. 1, 102A-102M, 106A-106N; FIG. 7, 700; FIG. 8, 800). The method comprises clustering (FIG. 5, 502) subsets of access requests (FIG. 7, 728) into respective clusters, which correspond to respective requestor types, based at least on the access requests in the subsets having respective attributes that indicate the respective requestor types. The access requests request access to cloud resources (FIG. 1, 110). The method further comprises receiving (FIG. 5, 504) an identified access request (FIG. 7, 730) from an access requestor of a first requestor type. The identified access request uses an identified access token to request performance of a designated access action. The method further comprises identifying (FIG. 5, 506) access behaviors that are associated with the access requests in the respective clusters and that correspond to the identified access token. The access behaviors include a first access behavior indicating first predicted likelihoods of respective actions to be performed with regard to a first arbitrary access request that corresponds to the first requestor type and that uses the identified access token. The access behaviors further include a second access behavior indicating second predicted likelihoods of the respective actions to be performed with regard to a second arbitrary access request that corresponds to the second requestor type and that uses the identified access token. The method further comprises determining (FIG. 5, 508) that the identified access request is a malicious access request based at least on the first access behavior indicating a relatively low predicted likelihood of the designated access action to be performed with regard to the first arbitrary access request that corresponds to the first requestor type and further based at least on the second access behavior indicating a relatively high predicted likelihood of the designated access action to be performed with regard to the second arbitrary access request that corresponds to the second requestor type. The method further comprises, as a result of determining that the identified access request is the malicious access request, performing (FIG. 5, 510) a security action (FIG. 7, 746) with regard to the identified access request.

(D2) In the method of D1, wherein determining that the identified access request is the malicious access request comprises: determining that the identified access request is the malicious access request based at least on an amount by which the relatively high predicted likelihood of the designated access action to be performed with regard to the second arbitrary access request that corresponds to the second requestor type exceeds the relatively low predicted likelihood of the designated access action to be performed with regard to the first arbitrary access request that corresponds to the first requestor type being greater than or equal to a threshold amount.

(D3) In the method of any of D1-D2, wherein determining that the identified access request is the malicious access request comprises: determining that the identified access request is the malicious access request based at least on the relatively low predicted likelihood of the designated access action to be performed with regard to the first arbitrary access request that corresponds to the first requestor type being less than or equal to a first likelihood threshold and further based at least on the relatively high predicted likelihood of the designated access action to be performed with regard to the second arbitrary access request that corresponds to the second requestor type being greater than or equal to a second likelihood threshold.

(D4) In the method of any of D1-D3, wherein determining that the identified access request is the malicious access request comprises: determining that the identified access request is the malicious access request even though the designated access action is within a scope of permissions that are defined by the identified access token.

(D5) In the method of any of D1-D4, further comprising: based at least on an amount by which a scope of permissions that are defined by the identified access token exceeds a scope of the first access behavior, which corresponds to the first requestor type, being greater than or equal to a threshold amount, providing a recommendation to reduce the scope of the permissions with regard to the first requestor type; and based at least on the scope of the permissions not being reduced with regard to the first requestor type within a period of time after the recommendation is provided, initiating monitoring of access requests corresponding to the first requestor type; wherein determining that the identified access request is the malicious access request is performed as a result of the monitoring being initiated.

(D6) In the method of any of D1-D5, wherein clustering the subsets of the access requests into the respective clusters comprises: clustering the subsets of the access requests into the respective clusters based at least on the access requests in the subsets being initiated by sources having IP addresses in respective ranges of IP addresses that indicate the respective requestor types.

(D7) In the method of any of D1-D6, wherein clustering the subsets of the access requests into the respective clusters comprises: clustering the subsets of the access requests into the respective clusters based at least on the subsets of the access requests having respective referrer attributes that indicate respective intermediate entities that correspond to the respective requestor types.

(D8) In the method of any of D1-D7, wherein clustering the subsets of the access requests into the respective clusters comprises: clustering the subsets of the access requests into the respective clusters based at least on the access requests in the subsets being received from user-agents that indicate the respective requestor types.

(D9) In the method of any of D1-D8, further comprising: identifying the first access behavior, which corresponds to the first requestor type, and the second access behavior, which corresponds to the second requestor type, by analyzing a data plane log that describes accesses of end users to a cloud resource using the identified access token.

(D10) In the method of any of D1-D9, further comprising: identifying the first access behavior, which corresponds to the first requestor type, and the second access behavior, which corresponds to the second requestor type, by analyzing a token management service log that describes administrative operations that are performed using the identified access token.

(D11) In the method of any of D1-D10, wherein performing the security action comprises: as the result of determining that the identified access request is the malicious access request, preventing the designated access action from being performed.

(D12) In the method of any of D1-D11, wherein performing the security action comprises: as the result of determining that the identified access request is the malicious access request, providing a security alert that indicates that the designated access action has a relatively low likelihood of being requested by an access requestor of the first requestor type.

(D13) In the method of any of D1-D12, further comprising: featurizing the attributes of the access requests in the subsets to provide features, which are numerical representations of the attributes; wherein clustering the subsets of the access requests comprises: clustering the subsets of the access requests into the respective clusters based at least on the features.

(E1) A first example computer program product (FIG. 8, 818, 822) comprising a computer-readable storage medium having instructions recorded thereon for enabling a processor-based system (FIG. 1, 102A-102M, 106A-106N; FIG. 4, 400; FIG. 8, 800) to perform operations. The operations comprise clustering (FIG. 2, 202) subsets of access requests (FIG. 4, 428) into respective clusters, which correspond to respective requestor types, based at least on the access requests in the subsets having respective attributes that indicate the respective requestor types. The access requests request access to cloud resources (FIG. 1, 110). The operations further comprise distinguishing (FIG. 2, 204) an identified group of the access requests from the other access requests based at least on the identified group being included in a designated cluster, which corresponds to a designated requestor type, and further based at least on the access requests that are included in the identified group utilizing a designated access token. The operations further comprise determining (FIG. 2, 206) that a received access request (FIG. 4, 430) is a malicious access request based at least on the received access request being received from an access requestor of the designated requestor type and further based at least on the received access request using the designated access token to request performance of an access action that is not included in a scope of access behavior that is associated with the identified group of the access requests. The operations further comprise, as a result of determining that the received access request is the malicious access request, performing (FIG. 2, 208) a security action (FIG. 4, 446) with regard to the received access request (F1) A second example computer program product (FIG. 8, 818, 822) comprising a computer-readable storage medium having instructions recorded thereon for enabling a processor-based system (FIG. 1, 102A-102M. 106A-106N; FIG. 7, 700; FIG. 8, 800) to perform operations. The operations comprise clustering (FIG. 5, 502) subsets of access requests (FIG. 7, 728) into respective clusters, which correspond to respective requestor types, based at least on the access requests in the subsets having respective attributes that indicate the respective requestor types. The access requests request access to cloud resources (FIG. 1, 110). The operations further comprise receiving (FIG. 5, 504) an identified access request (FIG. 7, 730) from an access requestor of a first requestor type. The identified access request uses an identified access token to request performance of a designated access action. The operations further comprise identifying (FIG. 5, 506) access behaviors that are associated with the access requests in the respective clusters and that correspond to the identified access token. The access behaviors include a first access behavior indicating first predicted likelihoods of respective actions to be performed with regard to a first arbitrary access request that corresponds to the first requestor type and that uses the identified access token. The access behaviors further include a second access behavior indicating second predicted likelihoods of the respective actions to be performed with regard to a second arbitrary access request that corresponds to the second requestor type and that uses the identified access token. The operations further comprise determining (FIG. 5, 508) that the identified access request is a malicious access request based at least on the first access behavior indicating a relatively low predicted likelihood of the designated access action to be performed with regard to the first arbitrary access request that corresponds to the first requestor type and further based at least on the second access behavior indicating a relatively high predicted likelihood of the designated access action to be performed with regard to the second arbitrary access request that corresponds to the second requestor type. The operations further comprise, as a result of determining that the identified access request is the malicious access request, performing (FIG. 5, 510) a security action (FIG. 7, 746) with regard to the identified access request III. Example Computer System FIG. 8 depicts an example computer 800 in which embodiments may be implemented. Any one or more of the user devices 102A-102M and/or any one or more of the servers 106A-106N shown in FIG. 1; computing system 400 shown in FIG. 4; and/or computing system 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the cluster-based security logic 108, the cluster-based security logic 408, the featurization logic 412, the clustering logic 414, the distinguishing logic 416, the maliciousness determination logic 418, the security action logic 420, the access behavior logic 422, the recommendation logic 424, the monitoring logic 426, the cluster-based security logic 708, the featurization logic 712, the clustering logic 714, the maliciousness determination logic 718, the security action logic 720, the access behavior logic 722, the recommendation logic 724, the monitoring logic 726, flowchart 200 (including any step of flowchart 200), flowchart 300 (including any step of flowchart 300), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

memory; and a processing system coupled to the memory, the processing system configured to:

cluster subsets of access requests into respective clusters, which correspond to respective requestor types, based at least on the access requests in the subsets having respective attributes that indicate the respective requestor types, the access requests requesting access to cloud resources;

distinguish an identified group of the access requests from the other access requests based at least on the identified group being included in a designated cluster, which corresponds to a designated requestor type, and further based at least on the access requests that are included in the identified group utilizing a designated access token;

determine a scope of access behavior that is associated with the identified group of the access requests by taking into consideration predicted likelihoods of respective actions to be performed with regard to an arbitrary access request that corresponds to the designated requestor type and that utilizes the designated access token, wherein the access behavior indicates the predicted likelihoods;

determine that a received access request is a malicious access request based at least on the received access request being received from an access requestor of the designated requestor type and further based at least on the received access request using the designated access token to request performance of an access action that is not included in the scope of the access behavior that is associated with the identified group of the access requests; and as a result of determining that the received access request is the malicious access request, perform a security action with regard to the received access request.

2. The system of claim 1, wherein the processing system is configured to:

determine that the received access request is the malicious access request even though the access action is within a scope of permissions that are defined by the designated access token.

3. The system of claim 1, wherein the processing system is configured to:

based at least on an amount by which a scope of permissions that are defined by the designated access token exceeds the scope of the access behavior that is associated with the identified group of the access requests being greater than or equal to a threshold amount, provide a recommendation to reduce the scope of the permissions with regard to the designated requestor type;

based at least on the scope of the permissions not being reduced with regard to the designated requestor type within a period of time after the recommendation is provided, initiate monitoring of access requests corresponding to the designated requestor type; and determine that the received access request is the malicious access request as a result of the monitoring being initiated.

4. The system of claim 1, wherein the processing system is configured to:

cluster the subsets of the access requests into the respective clusters based at least on the access requests in the subsets being:

initiated by sources having IP addresses in respective ranges of IP addresses that indicate the respective requestor types;

referred by intermediate entities that indicate the respective requestor types; or received from user-agents that indicate the respective requestor types.

5. The system of claim 1, wherein the processing system is further configured to:

identify the access behavior that is associated with the identified group of the access requests by analyzing:

a data plane log that describes accesses of end users to a cloud resource using the designated access token; or a token management service log that describes administrative operations that are performed using the designated access token.

6. The system of claim 1, wherein the processing system is configured to:

as the result of determining that the received access request is the malicious access request, perform the security action by preventing the access action from being performed.

7. The system of claim 1, wherein the processing system is configured to:

as the result of determining that the received access request is the malicious access request, perform the security action by providing a security alert that indicates that the access action is not included in the scope of the access behavior that is associated with the identified group of the access requests.

8. The system of claim 1, wherein the processing system is configured to:

featurize the attributes of the access requests in the subsets to provide features, which are numerical representations of the attributes; and cluster the subsets of the access requests into the respective clusters based at least on the features.

9. A method implemented by a computing system, the method comprising:

clustering subsets of access requests into respective clusters, which correspond to respective requestor types, based at least on the access requests in the subsets having respective attributes that indicate the respective requestor types, the access requests requesting access to cloud resources;

receiving an identified access request from an access requestor of a first requestor type, the identified access request using an identified access token to request performance of a designated access action;

identifying access behaviors that are associated with the access requests in the respective clusters and that correspond to the identified access token, the access behaviors including a first access behavior indicating first predicted likelihoods of respective actions to be performed with regard to a first arbitrary access request that corresponds to the first requestor type and that uses the identified access token, the access behaviors further including a second access behavior indicating second predicted likelihoods of the respective actions to be performed with regard to a second arbitrary access request that corresponds to the second requestor type and that uses the identified access token;

determining that the identified access request is a malicious access request based at least on the first access behavior indicating a relatively low predicted likelihood of the designated access action to be performed with regard to the first arbitrary access request that corresponds to the first requestor type and further based at least on the second access behavior indicating a relatively high predicted likelihood of the designated access action to be performed with regard to the second arbitrary access request that corresponds to the second requestor type; and as a result of determining that the identified access request is the malicious access request, performing a security action with regard to the identified access request.

10. The method of claim 9, wherein determining that the identified access request is the malicious access request comprises:

determining that the identified access request is the malicious access request based at least on an amount by which the relatively high predicted likelihood of the designated access action to be performed with regard to the second arbitrary access request that corresponds to the second requestor type exceeds the relatively low predicted likelihood of the designated access action to be performed with regard to the first arbitrary access request that corresponds to the first requestor type being greater than or equal to a threshold amount.

11. The method of claim 9, wherein determining that the identified access request is the malicious access request comprises:

determining that the identified access request is the malicious access request based at least on the relatively low predicted likelihood of the designated access action to be performed with regard to the first arbitrary access request that corresponds to the first requestor type being less than or equal to a first likelihood threshold and further based at least on the relatively high predicted likelihood of the designated access action to be performed with regard to the second arbitrary access request that corresponds to the second requestor type being greater than or equal to a second likelihood threshold.

12. The method of claim 9, wherein determining that the identified access request is the malicious access request comprises:

determining that the identified access request is the malicious access request even though the designated access action is within a scope of permissions that are defined by the identified access token.

13. The method of claim 9, further comprising:

based at least on an amount by which a scope of permissions that are defined by the identified access token exceeds a scope of the first access behavior, which corresponds to the first requestor type, being greater than or equal to a threshold amount, providing a recommendation to reduce the scope of the permissions with regard to the first requestor type; and based at least on the scope of the permissions not being reduced with regard to the first requestor type within a period of time after the recommendation is provided, initiating monitoring of access requests corresponding to the first requestor type;

wherein determining that the identified access request is the malicious access request is performed as a result of the monitoring being initiated.

14. The method of claim 9, wherein clustering the subsets of the access requests into the respective clusters comprises:

clustering the subsets of the access requests into the respective clusters based at least on the access requests in the subsets being:

initiated by sources having IP addresses in respective ranges of IP addresses that indicate the respective requestor types;

referred by intermediate entities that indicate the respective requestor types; or received from user-agents that indicate the respective requestor types.

15. The method of claim 9, further comprising:

identifying the first access behavior, which corresponds to the first requestor type, and the second access behavior, which corresponds to the second requestor type, by analyzing:

a data plane log that describes accesses of end users to a cloud resource using the identified access token; or a token management service log that describes administrative operations that are performed using the identified access token.

16. The method of claim 9, wherein performing the security action comprises:

as the result of determining that the identified access request is the malicious access request, preventing the designated access action from being performed.

17. The method of claim 9, wherein performing the security action comprises:

as the result of determining that the identified access request is the malicious access request, providing a security alert that indicates that the designated access action has a relatively low likelihood of being requested by an access requestor of the first requestor type.

18. The method of claim 9, further comprising:

featurizing the attributes of the access requests in the subsets to provide features, which are numerical representations of the attributes;

wherein clustering the subsets of the access requests comprises:

clustering the subsets of the access requests into the respective clusters based at least on the features.

19. A computer program product comprising a computer-readable storage medium having instructions recorded thereon for enabling a processor-based system to perform operations, the operations comprising:

clustering subsets of access requests into respective clusters, which correspond to respective requestor types, based at least on the access requests in the subsets having respective attributes that indicate the respective requestor types, the access requests requesting access to cloud resources;

receiving an identified access request from an access requestor of a first requestor type, the identified access request using an identified access token to request performance of a designated access action;

identifying access behaviors that are associated with the access requests in the respective clusters and that correspond to the identified access token, the access behaviors including a first access behavior indicating first predicted likelihoods of respective actions to be performed with regard to a first arbitrary access request that corresponds to the first requestor type and that uses the identified access token, the access behaviors further including a second access behavior indicating second predicted likelihoods of the respective actions to be performed with regard to a second arbitrary access request that corresponds to the second requestor type and that uses the identified access token;

determining that the identified access request is a malicious access request based at least on the first access behavior indicating a relatively low predicted likelihood of the designated access action to be performed with regard to the first arbitrary access request that corresponds to the first requestor type and further based at least on the second access behavior indicating a relatively high predicted likelihood of the designated access action to be performed with regard to the second arbitrary access request that corresponds to the second requestor type; and as a result of determining that the identified access request is the malicious access request, performing a security action with regard to the identified access request.

20. The computer program product of claim 19, wherein the operations comprise:

determining that the identified access request is the malicious access request based at least on:

an amount by which the relatively high predicted likelihood of the designated access action to be performed with regard to the second arbitrary access request that corresponds to the second requestor type exceeds the relatively low predicted likelihood of the designated access action to be performed with regard to the first arbitrary access request that corresponds to the first requestor type being greater than or equal to a threshold amount, or the relatively low predicted likelihood of the designated access action to be performed with regard to the first arbitrary access request that corresponds to the first requestor type being less than or equal to a first likelihood threshold and the relatively high predicted likelihood of the designated access action to be performed with regard to the second arbitrary access request that corresponds to the second requestor type being greater than or equal to a second likelihood threshold.

* * * * *